Patented June 27, 1950

2,512,672

UNITED STATES PATENT OFFICE 2,512,672

SOLUBLE AND FUSIBLE FORMALIZATION PRODUCTS OF UREA-FORMALDEHYDE RESINOUS CONDENSATES

Emil E. Novotny, Prospectville, George Karl Vogelsang, La Mott, and Ernest E. Novotny, Philadelphia, Pa., assignors to The Borden Company, New York, N. Y., a corporation of New Jersey No Drawing. Application October 15, 1945, Serial No. 622,482

6 Claims. (Cl. 260—69)

The present invention concerns itself with improvements relating to urea-formaldehyde resinous condensation products, and represents a continuation-in-part of our invention disclosed in co-pending application Serial No. 609,716, filed August 8, 1945. More specifically stated the present invention concerns itself with new and novel products produced by reacting concentrated urea-formaldehyde resinous condensate with formaldehyde. The distinctive products thus produced appear to be "acetals" of urea-formaldehyde resinous condensates.

Heretofore it has been assumed that not more than two molecules of formaldehyde could enter into combination with one molecule of urea to form a urea-formaldehyde resinous condensate. We have made the discovery that when formaldehyde of suitable strength is added to appropriate urea-formaldehyde resinous condensates, under suitable conditions, reaction occurs, leading to the formation of new and distinctive products. The products thus formed appear to be in the nature of hemi-acetals. We have made the further discovery that by subjecting the above reaction products to an additional treatment it is possible to achieve a further reaction, leading to the production of what appear to be true acetals.

Aqueous preparations of urea-formaldehyde resinous condensates are in the nature of disperse systems of hydrophilic colloids. The resinous condensate has associated with it substantial quantities of water of combination. We find that just as urea-formaldehyde resinous condensates affix to themselves, in a state of more or less loose association, molecules of water, so, in a parallel manner, can they affix to themselves molecules of formaldehyde. Formaldehyde thusly bound to a urea-formaldehyde resinous condensate, appears to be fixed by means of a hemi-acetal linkage. We have further found that aqueous concentrated solutions of formaldehyde exert a powerful solvent effect upon the urea-formaldehyde resinous condensate, as well as the formalization products thereof. In many instances the solvent effects of the formaldehyde are sufficiently great so as to permit its use as a coupling agent between the urea-formaldehyde resinous condensate and products with which such compositions are normally incompatible, including water in the instance of the limited water-soluble type.

Our studies indicate that the hemi-formalization products constitute complex systems whose various components are in a state of dynamic equilibrium with one another. In such a system the water exists (1) more or less firmly bound to the urea-formaldehyde resinous condensate; (2) bound to formaldehyde (e. g., methylene glycol, etc.); (3) as free water. In these systems the formaldehyde exists (1) more or less firmly bound to the urea-formaldehyde resinous condensate, probably in the form of the hemi-acetal and (2) in combination with water (e. g., methylene glycol, etc.). There is also present the triple addition products comprising urea-formaldehyde resinous condensate in combination with water and formaldehyde.

The hemi-formalization products comprise water, formaldehyde, reaction products between formaldehyde and water such as methylene glycol, etc., hydrated urea-formaldehyde resinous condensate, the reaction product of urea-formaldehyde resinous condensate with formaldehyde, as well as the triple addition products comprising urea-formaldehyde resinous condensate, water and formaldehyde. These components are engaged in a variety of reversible reactions, leading to a state of dynamic equilibrium. The addition or removal of any of the components present in the system has the effect of shifting the equilibrium in accordance with the laws of mass action.

In order that the unique and distinctive attributes of the hemi-formalization products may manifest themselves in a degree adequate to permit one to capitalize upon them, it is self evident that the various components that enter into the complex composition of the present invention must be present within certain predetermined concentration ranges. When the concentration of any one of the components entering into the system falls too far outside of the predetermined preferred concentration range, then the new and distinctive features of the products of the present invention do not manifest themselves to a degree that is adequate to permit one to capitalize upon them for purposes of specific applications.

The hemi-formalization products are produced by adding predetermined quantities of formaldehyde in concentrated form to concentrated urea-formaldehyde resinous condensates of appropriate composition. There are at least five conditions or features that are essential to the successful production of the hemi-formalization products.

Three of these conditions have to do with the concentrated urea-formaldehyde resinous condensates, i. e., the resinous condensates prior to their "hemi-formalization." The other two conditions concern themselves with the "hemi-formalization." The criteria and detail that surround these conditions will now be presented.

*Condition 1.*—For the production of the concentrated urea-formaldehyde resinous condensate (i. e., before the "formalization") there should be used substantially two moles of formaldehyde per mole of urea. The use of less than 1.5 moles of formaldehyde per mole of urea is not recommended because under such circumstances it is difficult to procure a satisfactory resinous condensate. On the other hand, the use of more than 2.5 moles of formaldehyde per mole of urea is equally undesirable, as it leads to a variety of difficulties. When excessive quantities of formaldehyde are used, in the form of the usual aqueous solutions, one ends up, after resinification, with a very dilute solution of condensate which must be concentrated to within predetermined limits, thus necessitating the distilling off of large quantities of water. Without recourse to the use of very special equipment it is not feasible to remove this water without at the same time removing the bulk of the excess formaldehyde. The formaldehyde concentration of the distillate thus procured is usually too low to permit of satisfactory utilization—the concentration of such dilute aqueous formaldehyde solutions is a costly operation whereas to discard the distillate represents an even greater economic loss. When the ratio of formaldehyde to urea exceeds substantially 2.5 moles per mole of urea, then the length of time required to produce the resinous condensate is unduly increased, a circumstance which decreases the output per unit of equipment.

In the production of concentrated urea-formaldehyde resinous condensates for the purposes of the present invention we recommend the use of between 1.75 and 2.5 moles of formaldehyde per mole of urea. The most satisfactory results appear to be secured when one utilizes two moles of formaldehyde per mole of urea.

In carrying out the reaction between formaldehyde and urea it is necessary that a certain amount of water be present. For reasons of economy it is customary to carry out this reaction by the use of aqueous formaldehyde solutions, e. g., those containing between 20 and 40 percent of formaldehyde are eminently satisfactory. Formaldehyde in more concentrated states, as for example in the so-called formaldehyde sludges, is equally satisfactory. We have found the usual commercial Formalin solution, containing about 37% formaldehyde, to be highly satisfactory. When the formaldehyde solution used has a concentration of less than 20% of formaldehyde it leads to an inefficient utilization of the formaldehyde and at the same time necessitates the distilling off of undesirably large quantities of water. When the formaldehyde content is in excess of 40% greater difficulties are encountered in carrying out the reaction, owing to excessive reaction velocities, i. e., a smoother and more easily controlled reaction is secured when the formaldehyde content is between 20 and 40%.

*Condition 2.*—For the purposes of the present invention the urea-formaldehyde resinous condensate must be concentrated to a point where the concentrate weighs between 2 and 2.5 parts per part of urea utilized in the reaction. The preferred weight of concentrate is in the neighborhood of 2.2 times the weight of urea utilized. To concentrate the product to below the minimum weight indicated represents needless expense and entails unnecessary difficulties. If the condensate be not concentrated down to the maximum indicated weight, then the subsequent "formalization" is interfered with.

*Condition 3.*—For the purposes of the present invention it is necessary that substantially the whole of the urea-formaldehyde condensate be "resinified." It is insufficient to carry out the condensation merely to the dimethylol urea stage. This end is best attained by first reacting the formaldehyde with the urea under conditions of controlled alkalinity, leading to the production of dimethylol urea. The dimethylol urea may then be conveniently converted over into a substantially wholly resinous condensate by subjecting it to further reaction in an acidic environment. By dividing the condensation of the formaldehyde with the urea into two stages, after the afore-described manner, it is found that a smoother control of the operation is secured and a greater degree of uniformity from run to run is procured. If the resinification has been properly carried out the resin is all in the dissolved stage, leading to the production of a water clear syrup. A small amount of cloudiness or opaqueness is not detrimental.

Concentrated urea-formaldehyde condensates which are produced in processes which conform to the afore-described three conditions consist almost wholly of urea-formaldehyde condensates in resinous form, and contain substantially no free urea or dimethylol urea.

*Condition 4.*—This condition concerns itself with the concentration of the formaldehyde that has to be added to the afore-described concentrated urea-formaldehyde resinous condensates to effect their "hemi-formalization." To be effective the formaldehyde of formalization must be in a concentrated state. One may utilize formaldehyde of 100% concentration, e. g., gaseous formaldehyde, or paraformaldehyde. For most applications, however, it is satisfactory and more economical to utilize aqueous formaldehyde solutions. The formaldehyde concentration of such solutions should be at least 25% inasmuch as the water sets a limit to the degree of formalization that is procurable. Commercial Formalin solutions containing about 37% of formaldehyde or the more concentrated formaldehyde sludges which may contain anywhere between 40 and 80% of formaldehyde are admirably suited. The less the quantity of water that is introduced along with the formaldehyde the higher the degree of formalization. On the other hand, the use of no water or too little water may result in compositions that are too viscous or possessed of too short a liquid life for some applications. Hence the maximum quantity of water that is tolerable will depend upon the ultimate use to which the product is put.

*Condition 5.*—This condition concerns itself with the quantity of formaldehyde that has to be added to achieve the formalization. In order that the distinctive attributes that are associated with the phenomenon of formalization manifest themselves to a substantial degree it is necessary that at least 0.5 mole of formaldehyde of formalization be added per mole of urea that entered into the making of the concentrated urea-formaldehyde resinous condensate. For most applications the optimum degree of formalization is achieved when one utilizes 1 mole of formaldehyde of formalization per mole of urea. Although there does not appear to be any theoretical limit as to the quantity of formaldehyde that may be utilized for purposes of formalization, it is noted that in practice it is undesirable to utilize more than 1.5 moles of formaldehyde per mole of urea owing to the difficulties encountered in effectively utilizing such excessive quantities of formaldehyde. In determining the amount of formaldehyde of formalization that is to be added to the resinous condensate, cognizance must be taken of any free formaldehyde that may be present in the concentrated urea-formaldehyde resinous condensate. When 1.75 moles of formaldehyde are reacted with a mole of urea to form the concentrated urea-formaldehyde resinous condensate, it will be found that the condensate contains only negligible quantities of free formaldehyde. When two moles of formaldehyde are utilized per mole of urea in the production of the urea-formaldehyde resinous condensate, it is found that after concentration, only a small quantity of free formaldehyde is present. On the other hand, when 2.5 moles of formaldehyde are utilized for reaction with the urea, it will be found that, after concentration, between 0.4 and 0.6 mole of free formaldehyde remain, which may be looked upon as available for formalization.

We wish to point out that the formaldehyde of formalization should not be confused with any excess formaldehyde that may have been employed in carrying out the original reaction between the urea and the formaldehyde inasmuch as, after concentration, the urea-formaldehyde resinous condensate will contain but little of the original excess formaldehyde, because all, or most of it, will have been removed in the process of distilling off the water.

It will be observed that there is a reasonable degree of leeway as regards the precise quantities of the various agents utilized in producing the hemi-formalization products. At the same time it will be observed that, when considered collectively, the successful prosecution of the present invention hinges upon the simultaneous fulfillment of a number of predetermined conditions for the production of the intermedial hemi-formalization product.

We wish it to be distinctly understood that although we have described a specific method for the preparation of concentrated formaldehyde-urea resinous condensates, one may utilize any of the methods known to the art for the preparation of similar condensates. Furthermore, in lieu of formaldehyde and urea one may utilize monomethylol urea and dimethylol urea for the production of the concentrated urea-formaldehyde resinous condensate. The above generalized description, as well as the subsequent specific description, for the preparation of concentrated urea-formaldehyde resinous condensates is presented only in the interest of clarity and for the purpose of exemplifying a preferred type of resinous condensate that is preeminently adapted to the preparation of the hemi-formalization products which constitute the essential intermediates out of which the hyper-formalization products of the present invention are produced.

We present below the detailed description of the preparation of an infinitely water-soluble type of concentrated urea-formaldehyde resinous condensate which is preeminently adapted to hemi-formalization. The process as outlined has been found to yield excellent results in (1) laboratory glassware, (2) pilot plant equipment, (3) large scale commercial operation, (4) operation via a continuous system as in pipes or a plurality of kettles connected in series. The process is one which has been found to yield unfailingly uniform and consistent products, both as to yield and quality.

*Example 1A.*—A commercial aqueous solution of formaldehyde (containing approximately 37% of formaldehyde) is preneutralized to a pH of between 7.0 and 7.5 via the addition of aqueous sodium hydroxide solution. After standing about 24 hours (or for shorter periods if elevated temperatures are employed) the formaldehyde solution is reneutralized to a pH of about 7.0. Charge into the reaction kettle 165 pounds of the above neutralized formaldehyde solution (2 moles), 60 pounds of urea (1 mole) along with 800 mil of catalyst No. 24364 and 320 mil of catalyst No. 24365. The catalyst imparts to the medium a controlled and buffered alkalinity. Stir the mixture and rapidly heat it to a temperature of between 205 and 212° F. The mixture is kept within this temperature range for a period of 4 minutes (at this point of the processing the reaction mixture consists essentially of a solution of dimethylol urea), at which time there is added 1600 mil of catalyst No. 24366. A vigorous exothermic reaction ensues, usually causing the mixture to boil and reflux if the reaction is carried out at atmospheric pressure (at appropriate super-atmospheric pressure the ebullition is suppressed). Six minutes later the reaction is brought to a halt by neutralizing the acidity and rendering the mass appropriately alkaline via the addition of 1600 mil of catalyst No. 24367. In this manner there is produced a dilute aqueous solution of a urea-formaldehyde resinous condensate which is ready for concentration. This solution contains only negligible quantities of unreacted urea or dimethylol urea.

The numbered catalysts and reagent solutions referred to in the above description are prepared as follows:

*Catalyst No. 24364.*—Into a one liter volumetric flask place 400 mil of a normal sodium hydroxide solution and 100 grams of boric acid. Then add sufficient water to make the volume up to one liter.

*Catalyst No. 24365.*—This is a dilute sodium hydroxide solution with a normality of 1.265.

*Catalyst No. 24366.*—Into a one liter volumetric flask place 30 grams of citric acid, USP; 48.1 mil of a 4.0/normal solution of sodium hydroxide; 54.7 mil of a 12.08 normal solution of hydrochloric acid; a quantity of water sufficient to make the volume up to one liter.

*Catalyst No. 24367.*—This represents a sodium hydroxide solution with a normality of 1.320.

The concentration of the above solution is best carried out by evaporation under reduced pressure. The use of a 20 to 28 inch vacuum has proven very satisfactory. It is desirable to regulate the rate of heating so that a rapid rate of distillation is maintained. The vacuum concentration may be stopped at any desirable point. For the purposes of the present invention it is desirable to remove the bulk of the water so as to secure a highly concentrated solution of urea-formaldehyde resinous condensate. It is recommended the dilute solution of urea-formaldehyde resinous condensate be concentrated to a weight of 132 pounds, i. e., 2.2 times the weight of the urea entering into the initial charge. The product thus produced constitutes what is hereinafter referred to as a "concentrated urea-formaldehyde resinous condensate."

It will be noted that we, in the above description, have set forth methods for the preparation of solutions of dimethylol urea, dilute aqueous solutions of urea-formaldehyde resinous condensate, and concentrated urea-formaldehyde resinous condensates.

For many applications it is desirable to buffer and stabilize the above concentrated urea-formaldehyde resinous condensate by adding thereto an appropriate buffer, e. g., the addition of a weak acid (such as boric acid) and the subsequent adjustment of the pH to between 8 and 9 via the addition of e. g., sodium hydroxide solution.

The concentrated urea-formaldehyde resinous condensate prepared as per the above directions is water clear and infinitely soluble in water. By prolonging the period of time during which the reacting mixture is in an acidic environment it is possible to produce products possessed of but a limited solubility in water. Generally, for the purposes of the present invention, it is advantageous to utilize the infinitely water soluble type of product inasmuch as it permits of greater leeway as regards the diversity of application, and, further, as will be indicated later, these materials in the process of hyper-formalization become converted into products of limited water solubility.

We wish to emphasize that we do not, in the present application, lay claim to any method for the manufacture of formaldehyde, urea, dimethylol urea, or concentrated urea-formaldehyde resinous concentrates. The above detailed description for the production of a concentrated urea-formaldehyde resinous condensate is presented only in the interests of clarity and for the purpose of illustrating a type of resinous condensate that readily lends itself to hemi-formalization and the subsequent hyper-formalization as envisaged in the present invention.

The hemi-formalization of the concentrated urea-formaldehyde resinous condensate is accomplished by adding thereto formaldehyde in any one of its various forms, provided that it is of adequate concentration. One may employ formaldehyde in the gaseous state, pure liquid formaldehyde, formaldehyde in the solid form (e. g., paraformaldehyde), or concentrated aqueous solutions of formaldehyde (aqueous solution with a formaldehyde content of not less than 25%). The two forms of formaldehyde most conveniently utilized in the pursuit of the present invention are aqueous formaldehyde solutions with a formaldehyde content of 37% and paraformaldehyde. Whether a 37% aqueous formaldehyde solution or paraformaldehyde is to be used for purposes of formalization should be predicated upon the ultimate application to which the product is put. The primary consideration in determining which form of formaldehyde is to be used depends upon the quantity of water that can be tolerated in the final composition.

For purposes of hemi-formalization one adds to the above described concentrated urea-formaldehyde resinous condensate between 0.5 and 1.5 moles of formaldehyde per mole of urea that went into the making of the said resinous concentrate. In the event that the concentrated urea-formaldehyde resinous condensate already contains a substantial quantity of formaldehyde over and above the 2 moles of formaldehyde per mole of urea (a condition which may result from the use of large quantities of formaldehyde in the carrying out of the initial reaction) then a proportionately smaller quantity of formaldehyde is added. For most applications we find that the "optimum" degree of formalization is achieved when the formaldehyde of formalization amounts to about one mole per mole of urea. It will be noted that when one adds one mole of formaldehyde of formalization to the preferred two moles of formaldehyde used in producing the resinous condensate, we have a total of 3 moles of formaldehyde per mole of urea.

We present below numerous examples depicting the production of the hemi-formalization products utilized in the production of the hyper-formalization products of the present invention.

*Example 2A.*—To 132 pounds of urea-formaldehyde resinous condensate (as per Example 1A) there are added 81 pounds of a 37% aqueous formaldehyde solution (methanol free). The materials are thoroughly mixed together.

*Example 2B.*—To 132 pounds of concentrated urea-formaldehyde resinous condensate (as per Example 1A) there are added 81 pounds of a 37% aqueous formaldehyde solution (containing methanol). The materials are thoroughly mixed together.

*Example 2C.*—To 132 pounds of concentrated urea-formaldehyde resinous condensate (as per Example 1A) there are added 30 pounds of paraformaldehyde. The ingredients are thoroughly mixed together. It is advantageous in this instance to carry out the mixing at somewhat elevated temperatures so as to expedite the solution of the paraformaldehyde. This hemi-formalization product is much more concentrated than that of the two previous examples. The specific gravity and specific viscosity are proportionately higher. Owing to the comparatively small water content of this type of product, it is preeminently suited for use in applications where substantial water concentrations are harmful or undesirable, as for example, for mixture with a wide variety of organic compounds.

*Example 2D.*—To 132 pounds of concentrated urea-formaldehyde resinous condensate (as per Example 1A) there are slowly added 30 pounds of gaseous formaldehyde. The rate of absorption of formaldehyde by the concentrated urea-formaldehyde resinous condensate is rather slow, so that it is necessary to employ vigorous agitation. The reaction is best carried out at somewhat elevated temperatures. However, a considerable amount of heat is evolved as a result of the interaction of the gaseous formaldehyde with the concentrated urea-formaldehyde resinous condensate making it necessary to provide suitable means for controlling the temperature.

*Example 2E.*—To 132 pounds of concentrated urea-formaldehyde resinous condensate (as per Example 1A) there are added 50 pounds of formaldehyde sludge (formaldehyde content 60%). The materials are thoroughly mixed together. It is advantageous to carry out the mixing at slightly elevated temperatures so as to secure a rapid dispersal and solution of the formaldehyde. The hemi-formalization product of this example is intermediate between that of Examples 2A and 2C.

If it is desired to secure the maximum shelf life out of the above hemi-formalization products it is recommended that they be stabilized via the addition of appropriate buffers, e. g. sodium borate solution adjusted so as to bring the pH of the final composition to between 8.0 and 9.0. For most applications it is unnecessary to stabilize and buffer the hemi-formalization product because, unlike the usual types of urea-formaldehyde resinous condensate, these products are possessed and endowed with new and unique attributes which result in a marked increase in shelf life and preclude the setting up of the material to the final "C" stage, as is ordinarily the case.

We have discovered that in lieu of employing concentrated urea-formaldehyde resinous condensates of the type illustrated in Example 1-A, we may also use what may be referred to as "modified" concentrated urea-formaldehyde resinous condensates for the preparation of hemi-formalization products suitable for the production of the hyper-formalization products of the present invention. The "modified" resinous condensates are produced by replacing a minor portion of the urea or the formaldehyde with other reactive compounds. It is to be noted, however, that for the production of the products of the present invention, urea and formaldehyde appear to be essential ingredients.

We shall consider first the partial replacement of the urea. The modifying agent should be of the type that is capable of entering into reaction with formaldehyde. The molar proportions of the modifying agent employed should under no circumstances be greater than the molar proportion of urea. The majority of "modifying agents" for this purpose belong to the class of organic compounds and are of a character such that they can, per se, react with formaldehyde. Materials that are usable for the purpose of modifying urea-formaldehyde resinous condensates are depicted in the following list: ammonium thiocyanate; urethanes; alkylidene urethanes and di-urethanes; carbamic acid derivative of amino-carboxylic acid and peptides; alkyl urea; ureides; ureides of hydroxy acid; dicarbamidic ester and related compounds; derivatives of imidocarbonic acid; hydrazine-, azine-, and azido-derivatives of carbonic acid; sulphur containing derivatives of carbamic acid and of urea; guanidine and its immediate derivatives; e. g. guanidine salts, alkyl-guanidines, guaneides of the hydroxy acids, creatine, creatinine, guaneides of carbonic acid, guanoline, guanyl urea, guanyl guanidine, cyano-guanidine, guanyl thiourea, nitro, amino and hydroxy guanidine and their transposition products, nitriles and imides of carbonic and thiocarbonic acid; oxygen derivatives of cyanogen, their isomerides and polymerides e. g., isocyanic acid, cyanuric acid and its alkylic derivatives; halogen derivatives of cyanogen and its polymers; sulphur compounds of cyanogen, their isomers and polymers, e. g. thiocyanate, cyanogen sulphide, alkyl-thiocyanate; thiocyanic compounds derived from aldehyde glycols, hydroxy ketones and hydroxy acids, e. g., thiocyanacetone; cyanamide, mono-alkylcyanamides; amides of cyanuric acid and imides of isocyanuric acid such as the various triazines, e. g., 2,4,6-triamino-1,3,5-triazine; as well as ammelide, ammeline, thioammeline; the guanamines, e. g., formoguanamine, acetoguanamine; tetra-azines etc. Other compounds that are useful for purposes of modification are the amino alcohols, hydroxy-amino compounds, carbohydrates (including the water-soluble derivatives of starches), mono- and polyhydric phenols, water-soluble phenol-formaldehyde reaction products; acetals of monohydric and polyhydric alcohols such as formal ethylene glycol, formal glycerol, furfurglycerol, butyl acetal and in general the acetals of the lower and intermediate alcohols; ketone-aldehyde condensation products of the water-soluble type; water-soluble protein materials; various water-soluble resins.

An alternative procedure to achieve the modification of the concentrated urea-formaldehyde resinous condensate that is to be subjected to the formalization of the present invention resides in replacing a portion of the formaldehyde with other aldehydes. We have found that the bulk of the aldehyde utilized for reaction with the urea should be formaldehyde and that the other aldehyde should be used in only limited quantities. Although no particular theoretical limitation is envisaged as regards the nature of the aldehyde that may be used for the replacement of a portion of the formaldehyde for the production of the concentrated urea-formaldehyde resinous condensate for use in the present invention, it is noted that there are but a limited number of aldehydes that are useful. Among such aldehydes may be mentioned acetaldehyde, propionaldehyde, normal butyl aldehyde, and isobutyl aldehyde. When utilizing acetaldehyde or propionaldehyde it is desirable to carry out the reaction under pressure owing to the volatility of these aldehydes. Butyl aldehyde reacts very slowly. Dialdehyde such as glyoxal may be utilized in this reaction, as may also various nitro aldehydes.

Various other modifications are possible by utilizing combinations of modifying agents or by mixing together concentrated urea-formaldehyde resinous condensates of dissimilar composition.

It is to be noted that all of the recommended "modifying agents" are of the type which contain one or more reactive hydrogen groups.

We present below a few examples illustrative of the use of "modifying agents."

*Example 1B.*—This example is in all respects identical with Example 1A except that in lieu of 60 pounds of urea there is substituted a mixture comprising 40 pounds of urea and 14 pounds of 2,4,6-triamino-1,3,5-triazine. After concentration the modified urea-formaldehyde resinous condensate may be formalized after the manner depicted in Examples 2A to 2E inclusive.

*Example 1C.*—This example is in all respects identical with Example 1A except that the 60 pounds of urea are replaced by a mixture comprising 48 pounds of urea and 14.8 pounds of formoguanamine (2,4-diamino-1,3,5-triazine.) After concentration the urea-formoguanamine formaldehyde resinous condensate may be formalized after the manner depicted in Examples 2A to 2E inclusive. Various other guanamines may be used in place of the formoguanamine.

*Example 1D.*—This example is in all respects identical with Example 1A except that in lieu of 60 pounds of urea there is used a mixture comprising 40 pounds of urea and 36 pounds of ammeline (6-oxy-2,4-diamino-1,3,5-triazine).

After concentration the modified urea-formaldehyde resinous condensate may be formalized after any of the methods depicted in Examples 2A to 2E inclusive.

*Example 1E.*—This example is in all respects identical with Example 1A except that in lieu of 60 pounds of urea there is used a mixture comprising 48 pounds of urea and 22 pounds of thioammeline. After concentration the modified resinous condensate may be formalized after the manner depicted in Examples 2A to 2E inclusive.

The effect of the inclusion of an appropriate "modifying agent" for the production of the formalization products of the present invention is to modify the physical and chemical properties of the ultimate formalization product. Thus, by way of example, some of the afore-described modified products of the illustrative examples are resistant to the action of boiling water when cured to the "C" stage in distinction to the unmodified products which, while resistant to cool water, are not resistant to boiling water. On the other hand, some modifying agents, such as guanyl guanidine, have the effect of diminishing the water-resistance of the ultimate cured product. The inclusion of an appropriate "modifying agent" is often desirable from the standpoint of producing emulsions, for it is well known that in the absence of a modifying agent it is not a simple matter to secure the conversion of the major portion of the resin into a colloidal form. Modifying agents are also of value in the modification of the solubility and compatibility relations of the hemi-formalized and hyper-formalized products. The speed of cure is also often very appreciably affected by the nature of the modifying agent used. Water tolerances are often markedly affected by the inclusion of a modifying agent.

Our present invention centers around the production of "hyper-formalization" products of concentrated urea-formaldehyde resinous condensates. We have dwelt at considerable length upon the subject of "hemi-formalization" products of concentrated urea-formaldehyde resinous condensates because they constitute essential intermediates out of which the products of the present invention are produced.

The first prerequisite for the production of the hyper-formalization products of the present invention is the production of "hemi-formalization" products of concentrated urea-formaldehyde resinous condensates in the manner above disclosed. The hyper-formalization is effected by subjecting the hemi-formalization product to further reaction in an acidic environment. The degree of hyper-formalization achieved is dependent upon the severity of the treatment to which the hemi-formalization product is subjected. The speed, as well as the degree of hyper-formalization achieved, is dependent upon the time, temperature and the hydrogen ion environment. Extraneous materials such as salts, solvents, diluents, or other compounds that may be present, may be expected to exert an effect upon the speed and degree of hyper-formalization achieved. Hyper-formalization occurs more readily at elevated temperatures than at room temperature, although it can be shown to occur even at sub-normal temperatures. Hyper-formalization occurs exceedingly slowly in an alkaline environment, very slowly in a neutral environment, and rapidly in an acidic environment, depending upon the degree of acidity.

When hemi-formalization products of concentrated urea-formaldehyde resinous condensates (buffered to a pH of 8.5) are permitted to stand at room temperatures for very long periods of time, e. g., two years or more, they gradually gel and, upon further prolonged standing (more rapidly at elevated temperatures) the gels may liquefy and the products gradually may become transformed into the hyper-formalization products of the present invention. Owing to the long periods of time involved, this reaction is purely of academic interest. When alkaline buffered hemi-formalization products of concentrated urea-formaldehyde resinous condensates are heated to a temperature of about 200° F. for a period of two weeks, they gradually become converted into a gel stage and may upon further heating liquefy and become converted into hyper-formalization products. The use of heat in conjunction with alkaline hemi-formalization products is not, however, a procedure that is commercially desirable.

When an appropriate quantity of a suitable strong acid is added to a hemi-formalization product of a urea-formaldehyde resinous condensate, a reaction almost immediately sets in. This reaction manifests itself at room temperatures by a gradual increase in viscosity. Under proper conditions the viscosity continues to increase until the material passes into a gelatinous state, and from thence on the gel becomes firmer and firmer until ultimately there may be a product which crumbles lie cheese. The reaction does not stop at this point, but continues, as is manifested by a gradual softening of the gel and its eventual liquefaction. The highly viscous fluid into which the firm gel gradually disintegrates becomes more and more fluid until ultimately its fluidity is not far different from that of the hemi-formalization product. During the course of this reaction formaldehyde is consumed and, if enough formaldehyde is consumed, the product acquires hydrophobic characteristics. If the same experiment be carried out at temperatures slightly above room temperature a similar cycle will be observed, but at a greatly accelerated pace. If temperatures in the neighborhood of 150° F. or above are utilized, the gelatinous phase is no longer observable as such, due to the fact that gelatinous material degenerates into the fluid hyper-formalization product at about the same rate as which it is engendered. Consequently, when the reaction is carried out at elevated temperatures, there is observed but little change in viscosity from the beginning to the end of the reaction. On the other hand, the formaldehyde content gradually diminishes as the reaction proceeds, concomitant with the water tolerance.

There are indications that the reaction mechanism involved in the conversion of any formalized urea-formaldehyde resinous condensate into the corresponding hyper-formalization product embraces the formation of intermedial or transitory reaction products. The progress of the reaction may be followed via chemical or physical criteria. Similarly, the hemi-formalization product can readily be distinguished from the hyper-formalization product via chemical and physical means.

In hemi-formalization products the formaldehyde is in a state of dynamic equilibrium with urea-formaldehyde resinous condensate as well as with water. Formaldehyde tied up by way of a hemi-acetal linkage is loosely combined and, as such, is in a condition where it can readily combine with agents that have a more powerful or irreversible affinity for the same, (as for example, the reagents utilized in the analytical determination of formaldehyde, e. g., sulfites, etc.). In the reaction of hyper-formalization formaldehyde is tied to the urea-formaldehyde resinous condensate via an acetal type of linkage, and, in this condition, the formaldehyde is in a state of dynamic equilibrium only under conditions of very substantial acidity. Under conditions of slight acidity, neutrality, or in an alkaline environment, the rate of reaction is so slow that it is, to all intents and purposes, nil. It follows that under conditions of mild acidity, neutrality, or alkalinity, the formaldehyde combined with the urea-formaldehyde resinous complex is "irreversibly" tied up and, as such, is not available for reaction with the usual formaldehyde reagents.

The course of the reaction is conveniently followed by determining the amount of formaldehyde consumed in the process of hyper-formalization. In many instances it is convenient to follow the course of the reaction by determining the water tolerance of the reaction product, inasmuch as the hemi-formalization product is, per se, infinitely water-soluble. The greater the degree of hyper-formalization the lower the water tolerance of the product. There are indications that when a product is formalized to the fullest extent it becomes substantially wholly insoluble in water (in the absence of free formaldehyde, which latter can function as a "coupling solvent").

The reactions involved in the process of hemi-formalization are apparently extremely rapid and to all intents and purposes may be looked upon as instantaneous. On the other hand the reactions involved in the process of hyper-formalization are much slower. The reaction of hemi-formalization precedes the reaction of hyper-formalization. Consequently, to prepare a hyper-formalization product one must first prepare a hemi-formalization product.

Our work has indicated that, for all practical purposes, the hemi-formalization products that are described in the present application, as well as those described in our co-pending application, Serial No. 609,716 filed August 8, 1945, are preeminently suited to hyper-formalization. Any hemi-formalization product may be subjected to hyper-formalization. Whereas in the instance of the hemi-formalization products we recommend the use of not more than 1.50 moles of formaldehyde of formalization to be added to the concentrated urea-formaldehyde resinous condensate (per mole of urea entering into the making of said condensate), there are numerous applications wherein the hyper-formalization product may embrace the use of much larger quantities of formaldehyde. This is true in applications where the excess formaldehyde (i. e., the formaldehyde that is "free" after the operation of hyper-formalization), is to be utilized in a subsequent processing step, as for instance by reaction with phenols, reactive amines, etc. There is, therefore, no essential upper limit to the quantity of appropriately concentrated formaldehyde that one may use in the process of hyper-formalization, in contradistinction to the operation of hemi-formalization.

Suitable for hyper-formalization are the hemi-formalization products of urea-formaldehyde resinous condensates comprising the system, urea-formaldehyde resinous condensate, formaldehyde, water, and the reversible reaction products of the same, prepared by admixing a concentrated urea-formaldehyde resinous condensate with formaldehyde preparations in the proportion of not less than 0.5 mole of formaldehyde per mole of urea consumed in the preparation of said urea-formaldehyde resinous condensate, which latter is prepared by reacting one mole of urea with between about 1.75 and about 2.5 moles of formaldehyde to the resinified state and then concentrating the resinified product to a net weight of between about 2.0 and about 2.5 times the weight of the urea consumed, said formaldehyde preparation having a formaldehyde content of not less than 25%.

In the process of hyper-formalization formaldehyde is consumed via a reaction which appears to involve the addition of formaldehyde to the urea-formaldehyde resinous complex by way of an acetal type of linkage. The quantity of formaldehyde consumed in the process is a measure of the degree of hyper-formalization achieved. We find that it is necessary that not less than about 0.10 mole of formaldehyde be consumed in the hyper-formalization, per mole of urea contained in the urea-formaldehyde resinous condensate, in order that the distinct and unique attributes associated with the hyper-formalization product manifest themselves to a substantial degree. The maximum quantity of formaldehyde that can be tied up in the process of hyper-formalization is not known with any degree of certainty. However, there is no difficulty in tying up over nine-tenths of a mole of formaldehyde in this manner, though this figure does not necessarily represent the maximum quantity of formaldehyde that can be consumed.

Hyper-formalization products are produced by subjecting hemi-formalization products to an appropriate acidic environment at such temperatures and for such periods of time as to assure the consumption of not less than one-tenth of a mole of formaldehyde per mole of urea entering into the hemi-formalization product. The acidic environment is most conveniently procured through the addition of an acid, although one may also utilize compounds which, in situ, break down to yield acids. We recommend the use of strong acids with dissociation constants of not less than about $1 \times 10^{-4}$. We do not recommend the use of weak acids, such as: acetic, arsenious, benzoic, boric, butyric, carbolic, carbonic, hydrocyannic, hydrosulphuric, hypochlorous, isobutyric, isovaleric, beta-naphthoic, nicotinic, propionic, pyro-tartaric, succinic, telluric, uric, valeric, etc. Suitable acids, i. e., those possessing dissociation constants of greater than $1 \times 10^{-4}$, are: arsenic, bromacetic, alpha-brompropionic, chloracetic, alpha-chlorpropionic, citric, dichloroacetic, formic, fumaric, hydrochloric, hydrobromic, hydroiodic, iodic, lactic, maleic, malic, malonic, nitric, oxalic, periodic, phosphorous, phosphoric, phthalic, pyrophosphoric, salicylic, sulfanilic, sulphuric, sulphurous, tartaric, tellurous, thiocyanic, trichloracetic acid, etc. Also suitable are the substituted sulphuric acids wherein one hydrogen atom is replaced with an organic group, e. g., ethyl sulphuric acid, benzene sulphuric acid, phenol-sulphonic acid, etc. Also usable are the salts of the stronger mineral acids and weak bases, e. g., zinc chloride, aluminum chloride, stannic chloride, etc. Also usable are the acid sulphates, e. g., ammonium acid sulphate. The preferred acids are those possessing dissociation constants of not less than $1 \times 10^{-2}$. Included in this category are: dichloroacetic, hydrochloric, hydrobromic, hydroiodic, iodic, maleic, nitric, oxalic, periodic, phosphoric, phosphorous, pyrophosphoric, sulphuric, sulphurous, trichloracetic and the sulphonic acids, such as ethyl sulphuric acid, benzene sulphuric acid, phenol sulphonic acid, etc.

We find that hydrochloric, sulphuric and phosphoric acids are the preferred acids because they are very economical, readily procurable and unsurpassed in efficacy. Furthermore, no unusual hazard is associated with the use of these well known acids. Of the three acids, in turn, we prefer hydrochloric acid, because upon a weight basis it can yield more hydrogen ions than either sulphuric acid or phosphoric acid, and, upon neutralization with soda, it yields a relatively harmless salt.

The quantity of acid to be utilized in the reaction of hyper-formalization is predicated upon the pH and the buffering capacity of the hemi-formalization product, as well as upon the time-temperature schedule to be used. Experience has shown that it is desirable to use a quantity of acid such as to engender a hydrogen ion concentration corresponding to a pH of below about 4.0. At pH 4.0 the rate of hyper-formalization is very slow, so that it is desirable that the hydrogen ion concentration be at least one hundred times greater, e. g., pH 2.0 or less. The use of moderately excessive quantities of acids with dissociation constants between $1 \times 10^{-2}$ and $1 \times 10^{-4}$ is not particularly harmful. On the other hand, the use of excessive quantities of acids with dissociation constants greater than $1 \times 10^{-2}$ should be avoided so as to prevent excessive profound decomposition of the urea-formaldehyde resinous condensate. There are indications that in the instance of acids with dissociation constants greater than $1 \times 10^{-2}$ one should not use more than about 0.35 mole of acid per mole of urea contained in the urea-formaldehyde resinous condensate. We find it very advantageous to utilize between 0.025 and 0.050 mole of hydrochloric acid per mole of urea contained in the urea-formaldehyde resinous condensate. The use of larger, or smaller, quantities of hydrochloric acid appears to be disadvantageous.

An exceedingly wide range of temperatures may be used in carrying out the hyper-formalization. At sub-room temperatures the rate of hyper-formalization is exceedingly slow. Even at room temperatures the rate of hyper-formalization is quite slow, so that, in general, it is desirable to utilize elevated temperatures. We have found it very convenient to utilize temperatures between about 150° F. and about 215° F. In instances where it is desirable to achieve an extremely rapid rate of hyper-formalization one may utilize temperatures as high as about 400° F., concomitant with the use of pressures sufficient to counteract ebullition and volatilization.

The time required to effect the desired degree of hyper-formalization is, of course, dependent upon the hydrogen ion concentration as well as the temperature. To achieve the maximum production from the plant equipment, the time should be as short as possible, yet not so short as to render the operation unduly critical. In the instance of a continuous flow system, operated at superatmospheric pressures and utilizing temperatures in excess of 300° F., one may utilize reaction periods of less than one minute. In batch production systems it is found convenient to utilize reaction times in the neighborhood of 30 minutes. In applications where the hyper-formalization product is to be kept in an acidic condition (for subsequent reaction with other components) it may suffice to conduct the hyper-formalization for a period of about five minutes. Accordingly, the acidity and the temperature employed in the hyper-formalization should be such that the operation may conveniently be carried out within a reasonable period of time. By way of example, we find that the use of about 0.035 mole of hydrochloric acid per mole of urea contained in the hemi-formalized urea-formaldehyde resinous condensate (buffered with boric acid and caustic soda to a pH of 8.5) yields compositions that are readily hyper-formalized within the framework of the above indicated preferred condition, viz., via temperatures between 150° F. and 215° F. maintained for a period of about 30 minutes (5 minutes in the instance of applications where the products are to be utilized for further reaction in an acidic environment). The hydrogen ion concentration of such mixtures corresponds to a pH of less than 1.0 and not infrequently is below zero in terms of the conventional pH scale. It is thus seen that it is desirable and convenient to carry out the hyper-formalization under conditions of extreme acidity.

For special applications it may be desirable to remove the acid catalyst used in the hyper-formalization. This may be accomplished by utilizing acids such as oxalic or sulphuric and, after reaction, precipitating out the acid via the use of calcium hydroxide or barium hydroxide respectively.

In the hyper-formalization of hemi-formalized urea-formaldehyde resinous condensates, a number of reactions appear to take place, more or less simultaneously, viz.: (1) First there occurs a reaction which consumes little, if any, formaldehyde by way of an acetal linkage. This reaction manifests itself in a thickening or gelling of the product (not manifest as an isolated phase when sufficiently elevated temperatures are utilized in conjunction with a high hydrogen ion concentration). (2) The reaction of hyper-formalization wherein formaldehyde is consumed. (3) Reactions associated with "aging." (4) Profound degeneration or decomposition of urea-formaldehyde resinous condensate, particularly when excessive quantities of strong acids are employed. When properly carried out the reaction of "hyper-formalization" is the predominant one. In any case, the reaction of "hemi-formalization" precedes the reaction of "hyper-formalization." Intermediate between the reactions of hemi-formalization and hyper-formalization, there occurs the already alluded to reaction which manifests itself in a transitory thickening or gelling of the composition.

After the operation of hyper-formalization the pH of the product may be adjusted to any desirable value, e. g., a pH of about 8.5 is recommended in the interest of maximum shelf life. Furthermore, the product may be "buffered," so as to assure the maintenance of the desirable pH for a longer period of time. The adjustment of the pH and the buffering of the hyper-formalized product are optional and incidental to the present invention. In a neutral or alkaline environment the hyper-formalization product may be looked upon as a stable and substantially irreversible reaction product.

The reaction mechanism involved in the formalization of urea-formaldehyde resinous condensates parallels the reaction mechanism involved in the formalization of aliphatic hydroxy compounds, mercaptans, and amino compounds. This parallelism is well exemplified by the following comparison. When formaldehyde (anhydrous, preferably in gaseous form) is added to a simple alcohol, such as methanol, it forms methyl formaldehyde hemi-acetal $$(CH_3OH + CH_2O \rightarrow CH_3OCH_2OH)$$

If more formaldehyde be present, then the same may enter into further reaction to yield, for example, methyl dioxy methylene hemi-acetal $$(CH_3OH + 2CH_2O \rightarrow CH_3OCH_2OCH_2OH)$$

These hemi-acetals are comparatively unstable and are results of reversible reactions. These acetals exist only in the form of solutions. Their existence, however, is a well established fact. Under neutral or alkaline conditions, hemi-acetals appear to be the sole reaction product between formaldehyde and alcohol. Under conditions of acidity the hemi-acetals that are first formed are capable of reacting with additional quantities of methanol to yield formaldehyde acetals or formals: thus methyl-formaldehyde hemi-acetal may react with a mole of methanol to yield methylal and water $$(CH_3OCH_2OH + CH_3OH \rightarrow CH_3OCH_2OCH_3 + H_2O)$$

It will be noted that the acetal formed does not contain any hydrophilic hydroxy group and, as a consequence, such acetals are possessed of a lesser solubility in water than are the hemi-acetals which are usually miscible with water in all proportions. In an acid environment the acetal reaction is of a reversible nature. It is to be noted that water is one of the reaction products. The water concentration present has a direct bearing upon the maximum concentration of acetal that can be formed in the equilibrium mixture. Acetals are possessed of a high degree of chemical stability under conditions of neutrality and alkalinity. Under acidic conditions, owing to the reversible nature of the reaction, they are readily split up by water. The formalization products of the lower alcohols are water-miscible, whereas those of the higher alcohols are only partially soluble.

Thioalcohols or mercaptans react in a manner quite analogous to that in which the ordinary aliphatic alcohols react. Here too, the hemi-mercaptals are relatively unstable and usually incapable of isolation whereas the mercaptals are quite stable.

The ammono-analogs of the unstable hemi-acetals may be produced by reacting formaldehyde with mono- or di-alkyl amines, leading to the formation of methanol-amines (alkyl amino methanols). Thus by reacting formaldehyde with mono- and dimethyl amine there are produced respectively methyl amino methanol and dimethyl amino methanol $(CH_3NH_2 + CH_2O \rightarrow CH_3NHCH_2OH$ and $(CH_3)_2NH + CH_2O \rightarrow (CH_3)_2NCH_2OH)$. Upon further reaction the methanol amines become converted into methylene amines. The methylene amines thus formed are the ammono-analogs of the formals. These products are stable under neutral or alkaline conditions, but, like the formals, are readily hydrolyzed under acidic conditions.

Water-soluble urea-formaldehyde resinous condensates possess functionally reactive attributes such as reactive hydrogen atoms and hydrophilic groups. There is abundant evidence that such resinous condensates contain one or more of the following atomic groupings: alcoholic hydroxy groups (—OH), primary amino groups (—NH$_2$), secondary amino groups (—NH—). Such atomic groups are capable of entering into reaction with formaldehyde to yield hemi- or full-(hyper-)formalization products. It is therefore not wholly unexpected and unanticipated that urea-formaldehyde resinous condensates are capable of entering into reaction with formaldehyde.

The reaction of formaldehyde with materials such as aliphatic alcohols, mercaptans, mono- or secondary-aliphatic amines, or urea-formaldehyde resinous condensates, are all reactions of "formalization." It is to be observed that two degrees of reactions may occur. The first reaction leads to the formation of "hemi" formalization products and the further reaction leads to the formation of the "normal," "full," or "hyper" formalization products. In the instance of the present invention we refer to the primary reaction products between formaldehyde and concentrated urea-formaldehyde resinous condensates as "hemi-formalization" products which correspond to the "hemi-formals" of the alcohols. We refer to the further reaction product between formaldehyde and urea-formaldehyde resinous condensates as "hyper-formalization" products which correspond to the "formals" of the alcohols. In the instance of the hemi-formalization products the prefix "hemi" signifies that the formaldehyde has entered into a reaction of formalization to only "half" the degree that it is capable of. In the instance of the hyper-formalization product the prefix "hyper" is used to indicate that a "higher" degree of formalization is achieved, so as to differentiate between it and the "hemi" formalization product.

It is to be noted that the "hemi-formalization" products of the alcohols as well as those of the ammono- and mercapto-analogs all contain the characteristic grouping, —CH$_2$OH. In the instance of the complete formalization products there is present in each case the characteristic methylene group, —CH$_2$—. In each instance the characteristic group is attached to the organic complex via an oxygen, sulphur or nitrogen atom. All indications point to the conclusion that the "hemi" and "hyper" formalization products of urea-formaldehyde resinous condensates contain the characteristic grouping —CH$_2$OH and —CH$_2$— respectively, linked to the urea-formaldehyde resinous complex via oxygen or nitrogen atoms.

The concentrated urea-formaldehyde resinous condensate of Example 1C (see below) was used in the preparation of the hemi-formalized urea-formaldehyde resinous condensate of Example 2F (see below). The product of Example 2F represents a preferred type of hemi-formalization product that is preeminently adapted to hyper-formalization. Hemi-formalization products equally adapted toward hyper-formalization may be prepared along the lines of Example 2F, but differing therefrom either in the quantity of formaldehyde of formalization utilized or in the concentration of the formaldehyde of formalization, e. g., in instances where low water concentrations are desirable it is recommended to use formaldehyde in concentrated form, i. e., formaldehyde sludges containing 50 to 80% of formaldehyde, paraformaldehyde, or gaseous formaldehyde.

*Example 1B.*—One mole of urea was reacted with 2.03 moles of aqueous formaldehyde (36.9% formaldehyde), after the manner set forth in Example 1A. Analysis disclosed that, in the step of concentrating, 0.0958 mole of formaldehyde was distilled off, leaving 1.9342 moles of formaldehyde in the concentrate. Of the formaldehyde in the concentrate approximately 0.333 mole was "free" ("free" in the sense that the formaldehyde was in a condition where it could react with the usual formaldehyde reagents, such as disulphite), while 1.6012 moles were "tied up" ("tied up" in the sense that the formaldehyde was no longer available for reaction with the usual reagents for formaldehyde). The formaldehyde that was "free" may be looked upon as formaldehyde that was available for hemi-formalization. The formaldehyde that was "tied up" may be looked upon as formaldehyde that was tied up with urea to yield the resinous condensate. Substantially no urea, monomethylol urea or dimethylol urea was isolated.

*Example 2F.*—The product of Example 1B was hemi-formalized by adding thereto 1.56 moles of a concentrated aqueous formaldehyde solution (formaldehyde content, 36.9%) per mole of urea contained in said product. The product was then buffered to a pH of 8.5 via the addition of a small quantity of boric acid and sodium hydroxide solution. Hemi-formalization products prepared after the above method are possessed of the following average properties: (1) infinitely water-soluble; (2) specific gravity, 1.248–1.252; (3) low temperature solids, 59.5%–60.5%; (4) "standard" solids, 44–47%; (5) specific viscosity, in centipoises, 150–250; (6) pH, 8.5 (or as desired); (7) nitrogen content, 12.0–12.7%; (8) "free" formaldehyde, 19–22%; (9) refractive index (28° C.), 1.4470–1.4490. The formaldehyde content of the hemi-formalization product utilized in the ensuing examples, assayed approximately 20%, corresponding to 1.45 moles of formaldehyde for "formalization."

We present below an array of illustrative examples depicting the hyper-formalization of hemi-formalized urea resinous condensates:

*Example 5A.*—Twenty-two ounces of the product of Example 2F were heated to 150° F. Twenty-five mil of 9.97 normal hydrochloric acid were then added and 15 seconds later 35 mil of 8 normal sodium hydroxide solution were added. The product was then cooled and the pH adjusted to 8.5 via the addition of 1.45 mil of 4 normal hydrochloric acid. The resultant clear syrup was infinitely water-soluble and assayed 17.3–17.8% "free" formaldehyde. The product of this example was "hyper-formalized" to but a very slight degree as is evidenced by the high formaldehyde content and the fact that it is infinitely water-soluble.

*Example 5B.*—Six mil of 9.97 normal hydrochloric acid were added to 22.09 oz. of the product of Example 2F, pH 1.33. In approximately two minutes the product had thickened to close to the gel point. At this point 10 mil of 8 normal sodium hydroxide solution were added. The product was now in the form of a broken up gel, possessing a consistency comparable to that of the usual gelatine desserts. The product was further stirred and heated upon a hot-water bath. Gradually the gel liquefied and at 180° F. only a few "fish eyes" were left. The product was cooled to room temperature and the pH adjusted to 8.8 via the addition of 2 mil of 4 normal hydrochloric acid. The resultant clear, viscous composition assayed 18.3–18.4% of formaldehyde and was infinitely water-soluble. The product of this example was hyper-formalized to but a very slight degree, as is evidenced by the high formaldehyde content and the fact that it is infinitely soluble in water.

*Example 5C.*—Twenty-two oz. of the product of Example 2F were heated to 150° F. Then 25 mil of 9.97 normal hydrochloric acid were added and exactly one minute later 34 mil of 8 normal sodium hydroxide solution were added. The product was cooled and the pH adjusted to 8.5 via the addition of 3.2 mil of 4 normal hydrochloric acid solution. The resultant clear syrup had a water tolerance of 5.57 parts (i. e., 1 part of the syrup tolerated 5.57 parts of water before a permanent precipitate was formed). The free formaldehyde content was found to be 16.05%. The product of this example is appreciably hyper-formalized as is indicated by the limited water-tolerance and by the fact that the formaldehyde content was substantially lower than that of the original product.

*Example 5D.*—Twenty-two ounces of the product of Example 2F were heated to 150° F. Then 25 mil of 9.6 normal hydrochloric acid were added. At the end of two minutes the product was cooled down to 100° F. and then 35 mil of 8 normal sodium hydroxide solution were added. The product was cooled to room temperature and the pH adjusted to 8.5 via the addition of 8.8 mil of 4 normal hydrochloric acid. On a weight basis one part of this product was able to tolerate 1.34 parts of water. The formaldehyde content assayed 12.3%.

*Example 5E.*—Twenty-two ounces of the product of Example 2F were heated to 150° F. Then 25 mil of 9.97 normal hydrochloric acid were added. Exactly 5 minutes later 34 mil of 8 normal sodium hydroxide solution were added. The product was cooled and the pH adjusted to 8.5 via the addition of 4.05 mil of 4 normal hydrochloric acid. One part by weight of the resultant clear syrup was able to tolerate 1.78 parts of water before giving a permanent precipitate. The formaldehyde content was assayed at 12.25%. The products of Examples 5D, 5E and 5F are substantially hyper-formalized as is shown by the low water-tolerance and the formaldehyde content, indicating a substantial consumption of formaldehyde in the process of hyper-formalization.

*Example 5F.*—Ten mil of 9.97 normal hydrochloric acid were added to 22 oz. of the product of Example 2F. The mixture was stirred and then set upon a boiling water bath. Within about a minute's time the product became exceedingly viscous, more or less gelatinous. As the product became hotter it became more fluid and in about 15 minutes it was wholly liquid. After 39 minutes upon the boiling water bath 12.5 mil of 8 normal hydrochloric acid were added. The product was cooled to room temperature and the pH adjusted to 8.5 via the addition of 1.7 mil of 4 normal sodium hydroxide solution. The formaldehyde content of the resultant clear syrup assayed 12.75%. One part by weight of the product was able to tolerate only 1.04 parts of water. The product of this example was possessed of a substantial degree of hyper-formalization, as is indicated by the formaldehyde consumed and by the low water-tolerance. It is to be noted that the formaldehyde content of this hyper-formalization product is on a substantial parity with that of Example 5E. On the other hand, whereas the product of Example 5E had a water-tolerance of 1.78 parts, the present example has a water-tolerance of but 1.41 parts, indicating that the formaldehyde content and the water tolerance are not directly correlated, but depend upon the quantity of acid used as well as the precise time-temperature schedule to which the mixture is subjected in the processing.

*Example 5G.*—Fifteen and one-quarter ounces of the product of Example 2F were heated to 170° F. Then 7 mil of 8 normal hydrochloric acid were added. It was observed that as soon as the 8 normal hydrochloric acid was introduced an exothermic reaction set in, sending the temperature up to about 190° F. At the end of 5 minutes the temperature had dropped to 180° F. and at the end of 10 minutes it was 170° F., at which time 8 mil of 8 normal sodium hydroxide solution were added. The mixture was cooled to room temperature and the pH adjusted to 8.5 via the addition of 2.4 mil of 4 normal sodium hydroxide solution. On a weight basis one part of the product was able to tolerate only 0.77 part of water. The formaldehyde content was assayed at 10.08%. The product of this example was possessed of a high degree of hyper-formalization as is indicated by the large quantity of formaldehyde that had disappeared in the reaction, as well as by the low water-tolerance.

*Example 5H.*—Ten mil of 8 normal hydrochloric acid were added to 21.8 oz. of the product of Example 2F. The mixture was stirred and placed upon a boiling water bath where it was kept for a period of 30 minutes. The product was then cooled and the pH adjusted to 8.5 via the addition of 24.2 mil of 4 normal sodium hydroxide solution. Products produced in this manner are in the form of clear syrups and are possessed of the following average properties: (1) water-tolerance, 1 part of product can tolerate between 0.30 and 0.60 parts of water; (2) specific gravity, 1.21–1.22; (3) low temperature "solids," 55.5%–59.0%; (4) standard "solids," 44.0–46.0%; (5) specific viscosity, centipoises, 200–350; (6) pH, 8.5 (or as desired); (7) nitrogen content, 11.7–12.5; (8) formaldehyde content, 6.0–8.0%; (9) refractive index (28° C.) 1.4390–1.4410.

*Example 5J.*—To 25 mil of the product of Example 2F (but unbuffered) there were added 0.20 mil of 9.97 normal hydrochloric acid. The product (pH 1.16) gelled in 6 minutes. After 8 days at room temperature it ungelled and passed into a liquid. Had the product, while in the gelled state, been heated, it would have liquefied almost immediately.

*Example 5K.*—To 25 mil of the product of Example 2F (but unbuffered) there were added 0.50 mil of 9.97 normal hydrochloric acid. The product gelled in one minute. After 2 to 3 days it ungelled to yield a clear liquid.

*Example 5L.*—To 25 mil of the product of Example 2F (but unbuffered) there was added 1 mil of 9.97 normal hydrochloric acid. The product gelled in 30 seconds. After one day it ungelled to yield a clear liquid.

*Example 5M.*—To 25 mil of the product of Example 2F (but unbuffered) there were added 2.0 mil of 9.97 normal hydrochloric acid. The product gelled in 20 seconds. In about 30 minutes it ungelled into a liquid of medium viscosity.

*Example 5N.*—To 25 mil of the product of Example 2F (but unbuffered) there were added 3.0 mil of 9.97 normal hydrochloric acid. The product gelled in 30 seconds and then almost immediately ungelled to yield a thin liquid.

*Example 5P.*—To 25 mil of the product of Example 2F (but unbuffered) there were added 5.0 mil of 9.97 normal hydrochloric acid. The material did not gel.

*Example 5Q.*—Examples 5J to 5P were repeated, but utilizing the unformalized product of Example 1B, but not concentrated so that the resin concentration was similar to that of Example 2F. In every one of these examples, upon the addition of the hydrochloric acid, the product almost immediately gelled and set to a stiff paste and then into a hard mass, which was infusible, thermo-rigid and in what may be referred to as the "C" or cured state.

*Example 5R.*—To depress the pH of the buffered product of Example 2F to 4.0 it was necessary to add 40 mil of normal hydrochloric acid to 21.8 oz. of product. This corresponds to 0.0141 mole of hydrochloric acid per mole of urea that entered into the preparation of the afore-said product. The rate of hyper-formalization was very slow.

*Example 5S.*—To depress the pH of the product of Example 2F, but unbuffered, to 4.0 it was necessary to add 13 mil of normal hydrochloric acid per 21.8 oz. of product. This corresponds to 0.00463 mole of hydrochloric acid per mole of urea that entered into the preparation of the afore-said product. The rate of hyper-formalization was very slow.

A quantitative consideration of the formaldehyde consumed in the process of hyper-formalization may be made by comparing the formaldehyde content of the hyper-formalization products with that of their progenitors, the hemi-formalization products. One should make due allowance for the dilution of the formaldehyde content of the hemi-formalization product by virtue of any acid (catalyst) and alkali (neutralizing or buffering agent) that may be added. These aspects are clearly set forth in the table.

*Table*

| Example No. | Weight of Hemi-formalization Product (per Example 2F) ounces | Hydrochloric Acid used (as catalyst) | | Weight of Hyper-formalization Product, ounces | Formaldehyde Content after Hyper-formalization | | Formaldehyde Consumed in the Hyper-formalization, Mole [2] | Water Tolerance [3] |
|---|---|---|---|---|---|---|---|---|
| | | mil. | Normality | | Percent | Mole [1] | | |
| 5A | 22.00 | 25.0 | 9.97 | 24.16 | 17.55 | 1.40 | 0.05 | ∞ |
| 5B | 22.09 | 6.0 | 9.97 | 22.73 | 18.35 | 1.38 | 0.07 | ∞ |
| 5C | 22.00 | 25.0 | 9.97 | 24.19 | 16.05 | 1.28 | 0.13 | 5.57 |
| 5D | 22.01 | 25.0 | 9.61 | 24.43 | 12.30 | 0.99 | 0.46 | 1.34 |
| 5E | 22.10 | 25.0 | 9.97 | 22.32 | 12.25 | 0.98 | 0.47 | 1.78 |
| 5F | 22.01 | 10.0 | 9.97 | 22.86 | 12.75 | 0.96 | 0.49 | 1.04 |
| 5G | 15.25 | 7.0 | 8.00 | 15.86 | 10.08 | 0.76 | 0.69 | 0.77 |
| 5H | 21.80 | 10.0 | 8.00 | 23.00 | 7.03 | 0.54 | 0.91 | 0.45 |

[1] Expressed in terms of mole HCHO ("Free" via analysis) per mole of urea. (Note that the hemi-formalization product (per Example 2F) used in these tests had a HCHO content ("free" via analysis) of 1.45 moles per mole of urea.)
[2] Expressed in terms of mole HCHO per mole urea.
[3] Expressed in terms of parts by weight of water that one part by weight of the product could tolerate without throwing out a permanent precipitate.

A study of the data contained in the above table clearly discloses that as a result of the operation of "hyper-formalization" formaldehyde is consumed. In the products of Examples 5A and 5B very little formaldehyde was consumed. In Example 5H it is disclosed that 0.91 mole of formaldehyde was consumed in the hyper-formalization. The quantity of formaldehyde consumed in this operation may be taken as a measure of the degree of hyper-formalization achieved. Comparing the quantity of formaldehyde consumed in the operation against the conditions prevailing during said operation leads to the conclusion that the degree of hyper-formalization, i. e., the quantity of formaldehyde consumed, is dependent upon the severity of the acid catalyst-time-temperature-schedule employed in the processing. It will also be observed that as the degree of hyper-formalization increases the water-tolerance diminishes.

Had the products of Examples 5A to 5H been prepared with a hemi-formalization product, as per Example 2F, but made with a more dilute formaldehyde of formalization, it would have been found that the degree of hyper-formalization achieved would have been less than that indicated in the table. Had a more concentrated formaldehyde for formalization been utilized then the degree of hyper-formalization attained would have been greater than that indicated in the table. Alternatively, if one takes a product hyper-formalized to about the maximum extent consistent with the prevailing conditions (e. g., Example 5H), and then adds water (after the hyper-formalization but before the neutralization of the catalyst) it is found that the hyper-formalization diminishes to a value below that indicated in the table. These findings clearly indicate that for a given ratio of formaldehyde to urea-formaldehyde resinous condensate and a given acid catalyst-time-temperature-schedule, the degree of hyper-formalization achievable is dependent upon the water concentration.

Had the hemi-formalization product of Example 2F contained a larger quantity of formaldehyde for formalization, then it would have been found that the products of Examples 5A to 5H would have been possessed of a greater degree of hyper-formalization than that indicated in the table. If, on the other hand, the hemi-formalization product of Example 2F had contained a lower formaldehyde content, then it would have been found that the corresponding hyper-formalization product as per Examples 5A to 5H would have shown a lesser degree of hyper-formalization. These facts lead to the conclusion that for a given water content and acid catalyst-time-temperature-schedule the degree of hyper-formalization achievable is dependent upon the formaldehyde concentration.

In the production of hyper-formalization products of urea-formaldehyde resinous condensates a considerable degree of latitude exists as regards the concentration of the resinous condensates, water, formaldehyde, and the acid catalyst as well as the time-temperature-schedule employed. The maximum degree of potential hyper-formalization is achieved with low water concentrations and high formaldehyde concentrations. The higher the acid catalyst concentration the faster the rate of reaction. The more severe the time-temperature-schedule the greater the degree of hyper-formalization achieved, short of the limiting value which is determined by the concentration of the urea-formaldehyde resinous condensate, the water, and the formaldehyde.

The above remarks regarding the influence of water upon the reaction between urea-formaldehyde resinous condensates and formaldehyde are, with some modification, also applicable to polar solvents for formaldehyde such as methanol, ethanol, phenol, etc. which may be used to replace a greater or lesser quantity of the water. In these instances the over-all reaction picture is somewhat more complicated due to (1) formation of formals via reaction between formaldehyde and alcohol; (2) formation of ethers via reaction of alcohol with urea-formaldehyde resinous condensate; (3) different solubility relationships.

In the production of hemi-formalization products out of urea-formaldehyde resinous condensates (e. g., Example 1A or 1B) we do not, in general, recommend the addition of more than 1.5 moles of formaldehyde to the concentrate. However, in the instance of the hyper-formalization products one may utilize considerably larger quantities of formaldehyde in processes where the surplus formaldehyde is going to be utilized for subsequent reaction with other materials. Consequently there is no definite upper limit to the quantity of formaldehyde that may be present during the operation of hyper-formalization.

The normal urea-formaldehyde resinous condensates, as well as their hemi-formalization products, owe their water-solubility to the presence of a plurality of hydrophilic groups (e. g., hydroxy and amino groups). In the process of acetal formation, as in the present process of hyper-formalization, these hydrophilic groups become consumed in the reaction of formalization and, as a consequence, one may anticipate a diminution in the water-soluble characteristics of the compound. A parallel may be drawn with this reaction and the diminution in water-solubility (or sensitiveness toward water) of polyvinyl alcohols upon treatment with aldehydes to yield acetals, e. g., polyvinyl formal and polyvinyl butyral.

An additional reason why hyper-formalization products are possessed of a diminished tolerance for water resides in the fact that in the process of hyper-formalization formaldehyde is consumed. We have found that formaldehyde serves as an excellent coupling agent between urea-formaldehyde resinous condensates (whether per se, hemi-formalized, or hyper-formalized) and water (as well as other materials). Due to the diminution in the quantity of free formaldehyde, owing to its consumption in the process of hyper-formalization, one may anticipate a diminution in water tolerance, arising out of the decreased coupling effect exerted by the smaller quantity of formaldehyde.

It will be observed that in the instance of the products of Examples No. 5A and No. 5B the ultimate product was infinitely miscible with water. In Example 5A the formaldehyde consumed in the operation of hyper-formalization amounted to 0.05 mole, whereas in Example 5B it amounted to 0.07 mole. On the other hand it will be observed that in Example 5C, wherein 0.13 mole of formaldehyde had been consumed, the product was no longer infinitely miscible with water, tolerating as it did, only 5.57 parts. We have found that in order that the unique and distinctive properties associated with the phenomenon of hyper-formalization may manifest themselves to a useful degree it is necessary that not less than about 0.10 mole of formaldehyde be consumed in the operation of hyper-formalization.

The maximum degree of formaldehyde that can be consumed in the process of hyper-formalization is not known with any degree of certainty. However, upon the basis of our findings, it appears that this limit is in the neighborhood of one mole of formaldehyde per mole of urea that entered into the making of the urea-formaldehyde resinous condensate. The precise quantity of formaldehyde consumed in the operation of hyper-formalization is dependent upon the history of the urea-formaldehyde resinous condensate. If the urea-formaldehyde resinous condensate is produced with substantially less than 2 moles of formaldehyde per mole of urea then there is a possibility that some of the formaldehyde for formalization is consumed in a reaction of resinification in lieu of the reaction of hyper-formalization. Similarly it is conceivable that when the urea-formaldehyde resinous condensate is prepared via the use of substantially more than two moles of formaldehyde per mole of urea in the original reaction then there is a possibility that a portion of the excess formaldehyde will be consumed via a reaction of hyper-formalization. Consequently a measure of the quantity of formaldehyde consumed in the operation of hyper-formalization, as is depicted in the table is not necessarily a true representation of the actual amount of formaldehyde fixed via the hyper-formalization reaction. The actual amount of formaldehyde so fixed may be a little greater or a little less than the quantity indicated in the table.

It will be observed that in the operation of hyper-formalization we recommend the use of acids (or their equivalents) possessed of dissociation constants of not less than $1 \times 10^{-4}$ in quantities such as to depress the pH to below about 4.0. In a preferred embodiment of the present invention we recommend the use of acids possessed of dissociation constants of not less than about $1 \times 10^{-2}$ in quantities such as to depress the pH to below about 2.0.

We present below an array of illustrative examples depicting the commercial utility of the hyper-formalization products of the present invention.

*Example 6A.*—The hyper-formalization products may be used "as is," as impregnants for a wide variety of materials. They may be utilized in the sizing of textiles. These products are useful adjuncts and modifiers for the preparation of starch adhesives. The products are admirably suited for the preparation of urea-formaldehyde dispersions. They are useful as dyeing and printing agents.

*Example 6B.*—When used in conjunction with appropriate coagents (comprising catalysts, formaldehyde acceptors, etc.) the hyper-formalization products are preeminently adapted for use as impregnants, adhesives, textile sizing agents, for the manufacture of molding compositions, for the manufacture of casting compositions, as well as for the preparation of dispersions.

*Example 6CA.*—The limited tolerance for water of the hyper-formalization products preeminently suits these materials to the preparation of aqueous dispersions. Such dispersions may be wholly colloidal in nature, or they may be in the form of coarse suspensions. These disperse separations contain a very high percentage of the total urea-formaldehyde condensate in a colloidal or suspended form, in marked contrast to the usual urea-formaldehyde resinous condensates, which are either wholly water-soluble or, when in the form of so-called colloidal dispersions, comprise only a small percentage of urea-formaldehyde resinous condensate in actual colloid form (a large part of the material being in true solution). As will be indicated in greater detail in a subsequent portion of these specifications, for the best results it is desirable to use "modified" types of hyper-formalization products.

*Example 6CB.*—We have made the further discovery that through the addition of appropriate amphorteric substances and the subsequent adjustment of the pH to a proper level with respect to the iso-electric point of said amphorlyte it is possible to prepare dispersions wherein all the dispersed particles are given a predetermined electrical charge, either negative or positive. As is well known, the majority of common substances, including woodflour, paper pulp, cotton, glass, hemp, wool, silk, asbestos, most mineral products, etc., etc., are under normal conditions possessed of a greater or lesser electro-negative change. In the instance of the vast majority of colloidal-dispersions on the market the individual particles are found to be possessed of an electronegative charge.

When a material such as paper pulp is immersed into such a dispersion of electro-negatively charged particles, it is found that there is a repellent tendency between the electro-negatively charged colloid particles and the electro-negatively charged pulp particles and as a consequence the pulp does not readily become coated with the colloidal particles. On the other hand, when the colloidal particles are electro-positively charged then the reverse situation prevails and there is an attraction between the electro-positively charged colloid particles and the electro-negatively charged pulp particles. It is found that when pulp is immersed in a dispersion comprising electro-positively charged particles the colloidal particles almost immediately disengage themselves from the dispersed phase and will tenaciously affix themselves to the paper pulp. In this wise it becomes possible to achieve a uniform dispersion and distribution of the dispersed material upon the pulp particles. Dispersions of electro-positively charged potentially reactive resinous particles are preeminently adapted for use in the so-called pulp forming process, in the manufacture of high wet strength paper products, inks, printing and dyeing aids, etc.

Although our technique of rendering the particles of a colloidal dispersion electro-positively charged is equally applicable to substantially all other known types of resins and allied products, we wish to point out that of the class of urea-formaldehyde resins the hyper-formalization products are preeminently suited, owing to the fact that they lend themselves to the ready preparation of dispersions wherein the bulk of the urea-formaldehyde resinous condensate is in the dispersed colloid form rather than in the molecularly dissolved state. This circumstance makes for a high percentage of resin pick-up, a factor of the utmost importance from the standpoint of the economics involved, particularly when one considers that in the pulp forming process, etc., the resin concentration in the dispersion is usually very low. See Example 7A for further details.

*Example 6D.*—The hyper-formalization products of urea-formaldehyde resinous condensates are preeminently adapted for further reaction with a wide variety of chemical compounds, particularly when the reaction is carried out under conditions of substantial acidity.

*Example 6EA.*—The hyper-formalization products may be reacted with aldehydes. In some instances the higher molecular weight aldehydes replace a greater or lesser portion of the formaldehyde. In other instances a more profound reaction takes place. The following example is typical:

Hemi-formalized urea-formaldehyde resinous condensate (21.8 oz.) is heated to 170° F.; then 10 mil of 8 normal hydrochloric acid are added. The mixture is kept at 170° F. for about 5 minutes, at which time 5 oz. of furfural are added. The mixture is kept upon a warm water bath for a period of 45 minutes, at the end of which time 25 mil of a 4 normal solution of sodium hydroxide are added. The product is then vacuum concentrated to a net weight of 23.8 oz. It is observed that when the furfural is added a very vigorous exothermic reaction sets in. The end product is possessed of a clear, amber color, with the following specifications: water-tolerance 4 mils per 10 mil of product; viscosity, 1875 centipoises; acid no., 10; specific gravity, 1.310; per cent solids (220° F.), 65%; pH, 4.31. On a 220° F. hot plate the material slowly sets up to the infusible state. The speed of cure is markedly accelerated by the addition of either alkaline or acid catalysts. The fact that alkaline catalysts can be used to speed up the cure is remarkable when it is considered that the usual urea-formaldehyde resins can only be cured via the aid of an acid catalyst.

*Example 6EB.*—The following example depicts the use of benzaldehyde as co-reactant:

Hemi-formalized urea-formaldehyde resinous condensate (21.80 oz.) is heated to 170° F. Eight normal hydrochloric acid (10 mil) is added and the mixture kept at 170° F. for about 5 minutes, at which time the benzaldehyde (5.3 oz.) is introduced. The mixture is heated on a boiling water bath for a period of about 4 hours and is then vacuum concentrated to a net weight of about 24 oz. There results a straw colored viscous fluid which upon further prolonged heating sets up to a soft elastic gel or, when baked, as upon a hot plate, yields a transparent, hard, infusible film.

*Example 6FA.*—The hyper-formalization product may be reacted with any one of a wide variety of organic compounds containing alcoholic hydroxy groups. The alcohol may be mono- or poly-hydric, it may be saturated or unsaturated, aliphatic, aromatic, or heterocyclic in character. The following example is illustrative:

Hemi-formalized urea-formaldehyde resinous condensate (21.8 oz.) is heated to 150° F. Twenty-five mil of 8 normal hydrochloric acid are then added and the mixture kept at 150° F. for about 5 minutes, at the end of which time 5.8 oz. of allyl alcohol are introduced. The mixture is placed upon a boiling water bath and after about 4 hours is vacuum concentrated to a net weight of 22.0 oz. The resultant viscous syrup is substantially insoluble in water and upon further heating or concentration passes into a gelatinous phase, which, upon dehydration, yields hard and horny products.

*Example 6FB.*—The following example depicts the use of butyl alcohol as co-reactant:

Hemi-formalized urea-formaldehyde resinous condensate (21.80 oz.) is heated to 150° F. Eight normal hydrochloric acid (25 mil) is added and the mixture kept at 150° F. for about 5 minutes, at which time 7.4 oz. of butyl alcohol are added. The mixture is refluxed for a period of two hours and then vacuum concentrated to a weight of approximately 20 oz. On cooling the mixture separates into two layers. The butyl-containing top layer is decanted. The resinous material, upon further heating, sets up to a gelatinous mass or, upon a 220° F. hot plate, it sets up to a hard, transparent film.

*Example 6G.*—Hyper-formalization products enter into reaction with all of the more reactive nitriles. The nitrile may be aliphatic, aromatic or heterocyclic in character. It may be saturated or unsaturated. The following example depicting the use of acrylonitrile is representative:

Hemi-formalized urea-formaldehyde resinous condensate (21.8 oz.) is heated to 170° F. Ten mil of 8 normal hydrochloric acid are then added and the mixture kept at 170° F. for a period of about 5 minutes, at the end of which time 2.65 oz. of acrylonitrile are added. The mixture is heated upon a hot water bath and refluxed for a period of approximately three hours, at the end of which time it is vacuum concentrated to a weight of approximately 23 oz. The end product was in the form of a water-white fluid of medium viscosity. It had a solids content of approximately 58%; a water-tolerance of 4 mil of water for 0.44 oz. of sample. On the hot plate the product set up to infusibility at a fairly rapid rate yielding a colorless film.

*Example 6G.*—The hyper-formalization product may be reacted with a plurality of divergent reagents. For example, it may be simultaneously reacted with an alcohol and a nitrile, as is depicted in the following example:

Hemi-formalized urea-formaldehyde resinous condensate (21.8 oz.) is heated to a temperature of 150° F., at which time 25 mil of 8 normal hydrochloric acid are added. The mixture is kept at 150° F. for about 5 minutes, at the end of which time 2.65 oz. of acrylonitrile and 5.80 oz. of allyl alcohol are added. The mixture is refluxed for a period of about 4 hours and is then vacuum concentrated to about 24 oz. The resultant light straw colored fluid had a specific gravity of 1.231; a solids content of approximately 55%, a viscosity of 390 centipoises; and a water-tolerance of 16 mil per 0.44 oz. of product.

*Example 6H.*—In the following example we depict the simultaneous reaction of the hyper-formalized product with acrylonitrile and furfural:

Hemi-formalized urea-formaldehyde resinous condensate (21.8 oz.) is heated to 150° F. Twenty-five mil of 8 normal hydrochloric acid are added and the mixture kept at 150° F. for about 5 minutes, at the end of which time 2.65 oz. of acrylonitrile are added. After refluxing for a period of about 2 hours, 15 mil of 8 normal sodium hydroxide solution are added, followed by the addition of 5 oz. of furfural. The mixture is kept on a boiling water bath for about 45 minutes, at the end of which time 30 mil of 4 normal sodium hydroxide solution are added and the product vacuum concentrated to a net weight of about 24 oz. The resultant clear amber-colored fluid possessed a viscosity of 285 centipoises; a specific gravity of 1.289; a solids content of approximately 60%; and a water-tolerance of 8 mil of water per 10 mil of product.

*Example 6J.*—Hyper-formalization products may be reacted with unsaturated monomeric substances which possess the ability to polymerize. The following example is representative:

Hemi-formalized urea-formaldehyde resinous condensate (15.25 oz.) is heated to 170° F. Then 7 mil of 8 normal hydrochloric acid are added and the mixture kept at 170° F. for about 5 minutes, at which time 3 oz. of vinyl acetate and 8 oz. of methanol are added and the mixture refluxed for about 2½ hours and then vacuum concentrated to approximately 20 oz. Ten mil of 8 normal sodium hydroxide solution are added, and the product further vacuum concentrated to a net weight of about 15 oz. The end product possessed a light straw color, a pH of 4.7, a viscosity of 120 centipoises, a specific gravity of 1.209 and a solids content of about 59%. The water-tolerance was very high. On a 220° F. hot plate the product gradually set up to infusibility. The material was very compatible with products such as dibutyl tartrate, benzyl alcohol, acetone-formaldehyde condensation products, phenol, furfural, glycerine, ethanol, allyl alcohol, etc.

*Example 6K.*—The following example illustrates the reaction of hyper-formalization products with vinyl acetate with a ketone-aldehyde condensation product added toward the end:

Hemi-formalized urea-formaldehyde resinous condensate (15.25 oz.) is heated to 170° F. Then 7 mil of 8 normal hydrochloric acid are added and the mixture kept at 170° F. for about 5 minutes, at the end of which time 3 oz. of vinyl acetate and 8 oz. of methanol are added. The mixture is then refluxed for about 3 hours after which it is vacuum concentrated to about 18 oz. Eight mil of 8 normal sodium hydroxide solution are then added and after vacuum concentration to 14 oz. 10 oz. of an acetone-formaldehyde condensate are added. The resultant light amber-colored product had a viscosity of 960 centipoises, a specific gravity of 1.26, and a solids content of 75%. It was very soluble in water.

*Example 6L.*—One of the unique features of the hyper-formalized urea-formaldehyde resinous condensates resides in their ability to enter into reaction with a wide variety of organic acids or their anhydrides. The acids may be aliphatic, aromatic, or heterocyclic in character. The acids may be saturated or unsaturated and may contain other functionally reactive groups. The following example is representative:

Hemi-formalized urea-formaldehyde resinous condensate (22.74 oz.) is heated to 150° F. Concentrated hydrochloric acid (25 mil) is added and the mixture kept at 150° F. for a period of about 5 minutes, at which time phthalic anhydride (2.57 oz.) is introduced. The mixture is stirred and heated upon a boiling water bath until all the phthalic anhydride has passed into solution. After the phthalic anhydride is dissolved it is desirable to heat the mixture a few more hours. The product may then be vacuum concentrated to a weight of about 21–22 oz. The end product, while hot, is in the form of an exceedingly viscous solution and, upon cooling, sets up to a firm gel which, however, is readily liquefied upon the application of heat. Interesting products are procured when utilizing unsaturated dicarboxylic acids such as maleic anhydride.

*Example 6M.*—Very interesting and useful products are procured by reacting hyper-formalized urea-formaldehyde resinous condensates with phenols under conditions of substantial acidity. The phenol may be monohydric or it may be polyhydric and it may contain other functionally reactive groups. The reaction between the phenol and the hyper-formalization products is oftentimes extremely energetic so that in practice due care must be exercised. A preferred procedure is to first heat the phenol to the desired temperature and to then slowly run in the hyper-formalized urea-formaldehyde resinous condensate over a predetermined period of time. The following example is typical:

Hemi-formalized urea-formaldehyde resinous condensate (21.8 oz.) is heated to 170° F. Concentrated hydrochloric acid (10 mil) is added and the mixture kept at 170° F. for a period of about 5 minutes. The phenol (9.40 oz.) is placed into a one liter flask and set upon a boiling water bath. Approximately 9.28 oz. of the above prepared hyper-formalized urea-formaldehyde resinous condensate is then introduced over a period of not less than 15 minutes. A vigorous reaction ensues during the time of addition, causing the mixture to reflux more or less vigorously. Toward the end of the operation the mixture separates into two layers. At this point it is recommended that concentrated sodium hydroxide solution be added in a quantity sufficient to render the mixture substantially neutral. The mixture is then vacuum concentrated to a predetermined end point, e. g., 12.85 oz. When thus concentrated there is procured a grindably hard resin which fuses upon the 310° F. hot plate. This resin is compatible with the standard phenolic resins but differs therefrom in that it is possessed of a lighter color. The "solids" content of the resin so produced was found to be 99.5%. Mixtures of phenols, including phenolic bodies, such as gum accroides, and cashew nut shell liquid and its derivatives may be utilized for the production of many new and novel compositions.

*Example 6NA.*—Hyper-formalized urea-formaldehyde resinous condensates are reactable with a wide variety of organic esters of the type that can be hydrolized or readily transposed. The following example depicting the use of vinyl acetate is representative:

Hemi-formalized urea-formaldehyde resinous condensate (21.8 oz.) is heated to 170° F. Eight normal hydrochloric acid (10 mil) is added and the mixture kept at 170° F. for a period of about 5 minutes, at the end of which time the vinyl acetate (4.30 oz.) is introduced. The mixture is refluxed for a period of about two hours. The resultant homogeneous end product contains a small amount of white precipitate which rests upon the bottom and sides of the vessel. The pH of the above product was 1.18. The acid number was 114. The specific gravity was 1.229, while the "solids" content was 54.5%. It will be observed that the above product was exceedingly acid. This acidity is engendered in the hydrolysis and decomposition of the vinyl acetate. The acidity may be diminished by neutralizing it with appropriate alkaline materials. A better method of diminishing the acidity is to carry out the reaction in the presence of an alcohol, such as methanol, which can combine with the acetic acid as it is liberated to form methyl acetate, as is depicted in the following example:

*Example 6NB.*—Hemi-formalized urea-formaldehyde resinous condensate (15.25 oz.) is heated to 170° F. Eight normal hydrochloric acid (7 mil) is added and the mixture kept at 170° F. for about 5 minutes, at the end of which time vinyl acetate (3.0 oz.) and methyl alcohol (8.0 oz.) are added. The mixture is refluxed for a period of about three hours, after which it is vacuum concentrated to a weight of approximately 18.0 oz. After the addition of about 8 mil of 8 normal sodium hydroxide solution the mass may be further vacuum concentrated to a weight of about 14 oz. There results a straw colored solution with a viscosity of 1545 centipoises, a pH of 4.68, and a "solids" content of 65%. Reaction products as the above are very compatible with a wide variety of materials. It is possible to prepare mixtures possessed of distinctive properties by utilizing the above type of vinyl acetate reaction product by adding thereto any of the following products, with the indicated results:

(a) To the end product of Example 6NB add 7 oz. of benzyl alcohol. A homogeneous solution results.

(b) To the hot product of Example 6NB add 7 oz. of diorthotoluyl guanidine. There results a grindably hard mixture which readily fuses down upon the hot plate.

(c) To the product of Example 6NB add 7 oz. of glycerine. There results a homogeneous light straw colored liquid with a "solids" content of 69.5%, a viscosity of 255 centipoises, an acid number of 28, and a specific gravity of 1.241.

(d) Various reactive materials, e. g., furfural may be added during or after the processing.

In the above reaction product (Example 6NB) where methyl alcohol is utilized as an acid acceptor one may replace the same via the use of other alcohols, e. g., ethyl alcohol, propyl alcohol or butyl alcohol.

In the processing of hyper-formalized urea-formaldehyde resinous condensates with other materials, it is to be noted that when the operation involves the step of vacuum concentration, substantial quantities of formaldehyde are removed from the reacting mass. In some instances it is advantageous to replace the whole or a portion of this formaldehyde via the addition of e. g., paraformaldehyde.

*Example 6P.*—Hyper-formalized urea-formaldehyde resinous condensates may be reacted with a wide variety of amines. The following example depicting the use of triethanolamine is representative:

Hemi-formalized urea-formaldehyde resinous condensate (15.25 parts) is heated to about 170° F. Hydrochloric acid (7 mil of 8 normal) is added and the mixture maintained at 170° F. for about 5 minutes. Triethanolamine (3.0 oz.) is then added and the mixture refluxed for a period of approximately 3 hours, at the end of which time the product is vacuum concentrated to a weight of about 15 oz. There results a viscous, light amber-colored fluid.

*Example 6Q.*—Hyper-formalized urea-formaldehyde resinous condensates may be reacted with a wide variety of nondescript organic compounds that contain functionally reactive groups. Furfuracetone, difurfuracetone, and its condensation products are examples of such a material. The following example is illustrative:

Hemi-formalized urea-formaldehyde resinous condensate (21.8 oz.) is heated to 170° F. Eight normal hydrochloric acid (10 mil) is added and the mixture kept at 150° F. for about 5 minutes, at the end of which time 10 mil of 8 normal sodium hydroxide solution are added along with a furfuracetone condensate (6 oz.). The mixture is heated upon a hot water bath for a period of about 10 minutes, so that the temperature becomes 200° F. The bath should then be lowered until the temperature drops to 190° F., at which time heat should be reapplied and the bath brought to a boil and kept there for a period of about 30 minutes. The product is then vacuum concentrated to a weight of about 24 oz. A coffee-colored thick emulsion of good stability results. On a 220° F. hot plate the material sets up quite readily to yield products of good strength. Acid catalysts, as well as alkaline catalysts, are effective in speeding up the rate of cure. The material is quite compatible with aliphatic and aromatic amines. Upon heating with ethylene diamine there results a clear, transparent amber-colored, infusible product. When mixed with acetone - formaldehyde condensation products there are produced materials which upon heating readily cure up to an insoluble and infusible state and which, upon the addition of appropriate quantities of strongly alkaline materials, may be caused to cure at room temperatures.

*Example 6R.*—Hyper-formalized urea-formaldehyde resinous condensates may be reacted with a wide variety of materials containing a plurality of alcoholic hydroxy groups, as typified by the water-soluble carbohydrates, such as table sugar, dextrose, levulose, as well as the various water-soluble materials that are derived from the processing of starch, e. g., dextrine. These carbohydrate materials may be modified by the inclusion of one or more ether or ester groups. Also usable are the acetals of these carbohydrates, as well as the products that result from their ammonolysis with ammonia under pressure. In general, to be reactive, the carbohydrate or modified carbohydrate should be water-soluble.

*Example 6S.*—It is oftentimes advantageous to use blends of modified or unmodified hyper-formalized urea-formaldehyde resinous condensates. The following is illustrative:

Mix one part by weight of the hyper-formalized urea-formaldehyde resinous condensate, as per Example 5H, with one part by weight of the product of Example 6EA. The following properties are representative of such a blend: specific gravity, 1.23–1.25; specific viscosity, 400–600 centipoises; nitrogen content, 11.75–12.5%; "regular" solids content, 50–55%; "low temperature solids," 58–63%; water-tolerance, approximately 3.6 mil per 10 mil of sample.

The product of Example 6S is outstanding as regards the ease with which it may be emulsified to yield colloidal dispersions wherein a large percentage of the resin content is in colloid form.

*Example 7A.*—The following example is intended to illustrate a manufacturing operation that may be advantageously realized through the use of the products of the present invention. The process as outlined is preeminently adapted to the manufacture of resin bonded composition via the so-called pulp forming process as well as for the preparation of resin reinforced paper products.

Two mixtures are prepared, the one comprising a dispersion of resin in water, wherein all the resin particles are electro-positively charged, and the other comprising a suspension of wood pulp (or other material) in water, the said wood pulp particles being all electro-negatively charged (which is the normal state of charge).

The dispersion of resin in water is prepared as follows:

Urea (1.10 oz.) is added to the product of Examples 6S (4.40 oz.), followed by the addition of 20 mil of 8 normal hydrochloric acid. With vigorous stirring, 50 mil of a 2% aqueous gelatin solution are added. Vigorous stirring is essential. Within about 15 seconds the composition begins to cloud up and at the end of about 2 to 2½ minutes a smooth, fine textured, emulsion comes into being. An examination of the emulsion via a cataphoresis apparatus discloses that all the colloidal particles are electro-positively charged.

A suspension of wood pulp (or other material) in water is prepared after the following manner:

To 50 grams of dry wood pulp (or the equivalent in the form of wet wood pulp) there are added 500 mil of water and 10 mil of a wetting agent (any efficient type of wetting agent is suitable). The mixture is well stirred for a few minutes and then 4.5 liter of water are added. After stirring a minute or so 22 mil of 4 normal hydrochloric acid solution are added.

For purposes of control it was found that the above prepared wood pulp suspension contained the equivalent of 45.5 grams of dry material.

The reason the product of Example 6S is selected for this application is because this type of product lends itself particularly to the preparation of aqueous dispersions. The function of the urea is to act as a formaldehyde acceptor for the formaldehyde of formalization which remains after the hyperization as well as for the formaldehyde that is liberated during the process of cure. The gelatin solution tends to stabilize the dispersion by virtue of its functioning as a protective colloid. However, the primary purpose of the gelatin is to coat the resin particles with an amphoteric material. The function of the hydrochloric acid is to depress the hydrogen ion concentration of the solution to a point well below the iso-electric point of the gelatin. Under these circumstances the gelatin-coated resin particles acquire a decided electro-positive charge.

The resinous dispersion should be slowly introduced into the vigorously agitated wood pulp suspension. It is essential that the resinous dispersion be added 2 to 2½ minutes from the time of making. Within a few seconds substantially the whole of the resin that is in colloid form will deposit itself on to the wood pulp. The coated wood pulp may then be separated from the bulk of the water via filtering or centrifuging. The filter cake may be further dried or processed as seen fit. For purposes of experiment the above filter cake was placed in an oven and dried to constant weight to ascertain the amount of resin picked up. It was found that after drying the mass weighed 94.6 grams and, inasmuch as the dried pulp weighed 45.5 grams, it is clear that 49.1 grams of resin were picked up. It is to be noted that the weight of resin picked up in this particular illustrative example exceeded the weight of pulp used. The ratio of resin to pulp may be varied over an extremely wide range. In lieu of wood pulp one may use any one of a wide variety of other cellulosic products, mineral wool, asbestos, glass, etc., etc.

In lieu of utilizing the product of Example 6S for the preparation of aqueous dispersions one may use many of the other products of the present invention. In applications where it is desirable to employ a colorless material we recommend the reaction product procured by reacting hyper-formalized urea-formaldehyde resinous condensate with a material such as acrylonitrile.

In some applications it is desirable to utilize a dispersion that is substantially 100% in colloidal form and that does not contain any resinous material in the molecularly dissolved state. Products approximating such a composition may be produced by precipitating the hyperformalized urea-formaldehyde resinous condensates or their modified versions via the addition of substantial quantities of water. The resinous material thus thrown out may be separated from the mother liquor in any of the usual ways. The concentrated and relatively insoluble resinous material thus thrown out may then be dispersed, as via a colloid mill. The resinous material remaining in the mother liquor may be re-cycled or utilized as seen fit, e. g., it may be vacuum concentrated and the resultant concentrate may be added at some suitable point in the manufacturing process of the urea-formaldehyde resinous condensate.

In many applications it is desirable to utilize a urea-formaldehyde resinous condensate dissolved in a solvent other than water or aqueous formaldehyde. The hyper-formalized urea-formaldehyde resinous condensates are quite soluble in a limited number of organic solvents, in many of which the usual types of urea-formaldehyde resinous condensates are substantially insoluble. For this purpose it is advantageous to utilize hyper-formalized urea-formaldehyde resinous condensates possessed of a low water content, e. g., those produced via the use of paraformaldehyde. Hyper-formalized urea-formaldehyde resinous condensates are, like their hemi-formalization analogs, insoluble in hydrocarbons, or in substituted hydrocarbons which do not contain hydrophilic groups. In order to function as a solvent it is necessary that the material contain a plurality of hydrophilic groups. The attribute of water-solubility does not of itself predispose the same to function as a solvent for hyper-formalized urea-formaldehyde resinous condensates. Thus acetone, which is readily water-soluble, is useless as a solvent for most of the hyper-formalization products of the present invention. Among solvents usable are glycerine, tetraethylene, glycol,1-chloro-1-nitro-propane, 1-chloro-nitro-ethane, ethyl lactate, ortho cresol, furfur-glycerol, allyl alcohol, morpholine, monomethyl ether of ethylene glycol, glyoxal, etc.

Mixtures so prepared are usually in the form of clear solutions, although occasionally one encounters cloudy or hazy compositions. The majority of these preparations are possessed of excellent keeping qualities. Mixtures, such as the above, particularly those with a low water content, are frequently compatible with numerous materials with which the straight hyper-formalized urea-formaldehyde resinous condensates are not compatible.

Preparations of technical interest can be prepared by admixing hyper-formalized urea-formaldehyde resinous condensates with water-soluble resinous substances, such as polyhydroxy-vinyl-acetate dissolved in aqueous methanol, or products such as sodium carboxymethyl cellulose. In this manner it is possible to regulate and control such properties as the viscosity, flow characteristics and brushability. Of particular interest in this connection are the products produced by reacting hyper-formalized urea-formaldehyde resinous condensates with unsaturated materials such as vinyl acetate, allyl alcohol, acrylonitrile, etc. or a combination of such materials. Such compositions may be utilized in the preparation of surface coatings. The addition of catalysts, such as cobalt naphthenate, is advantageous, as these materials expedite the polymerization of the polymerizable groups. For the best results the coating should be given a moderate bake, as this tends to thermoset the urea resin complex while the oxygen tends to link the various double bonds that are present. The hemi-formalized, as well as the hyper-formalized urea-formaldehyde resinous condensates (particularly their reaction products with other materials, as illustrated in the foregoing examples) are of interest for use in conjunction with other resinous products with which they are compatible, e. g., phenol-formaldehyde resins, ketone-aldehyde resins, etc.

The products of the present invention are useful for thermosetting or cross-linking materials such as polyvinyl butyral, protein products, etc. When used for these applications it is only necessary to add between 5 and 25% of the hemi- or hyper-formalized materials on the weight of the material to be set. Upon subjecting the mixture to an appropriate heat treatment the same is thermoset or cured. In the instance of polyvinyl butyrals it is frequently desirable to use an appropriately modified type because the modification enables one to endow the product with a greater compatibility toward polyvinyl butyral.

The hemi- and the hyper-formalized urea-formaldehyde resinous condensates, as well as their numerous modifications, may be used in conjunction with standard aminoplast resins, such as the common urea-formaldehyde resins, melamine resins, formo-guanamine resins, thiourea-formaldehyde resins, etc.

The compositions of the hemi-formalization products as well as those of the concentrated urea-formaldehyde resinous condensates that go into their preparation, are conveniently defined in terms of their progenitors, viz., urea, formaldehyde and water, provided, of course, that cognizance is taken of the fact that these products normally contain no free urea, monomethylol urea or dimethylol-urea and that the whole of the urea is in the form of a resinous condensation product. The composition may then be expressed either in terms of weight or in terms of molar proportions. The following data, based upon the aforemethod of defining the composition in terms of the progenitors, is typical:

*Product of Example 2A.*—Expressed upon a weight basis we have: urea, 60 parts; formaldehyde (HCHO), 90 parts; water 63 parts. Expressed upon a molar basis we have: urea, 1 mole; formaldehyde (HCHO), 3 moles; water 3.5 moles.

*Product of Example 2C.*—Expressed upon a weight basis we have: urea, 60 parts; formaldehyde (HCHO), 90 parts; water 12 parts. Expressed upon a molar basis we have: urea, 1 mole; formaldehyde (HCHO), 3 moles; water 0.667 mole.

Using the above method of defining the composition, it will be noted that if the condensate of Example 1A had been concentrated to a weight of 120 parts (corresponding to twice the weight of urea utilized, and if the product were then hemi-formalized via the use of gaseous formaldehyde or paraformaldehyde, the water concentration would appear to be zero. Actually such a composition would contain a certain small amount of water, substantially all of which would be held in a state of more or less loose association by the urea-formaldehyde resinous condensate and the formaldehyde.

It will be noted that if the condensate of Example 1A be concentrated to 2½ times the weight of urea utilized, there would be present 30 parts of water per 60 parts of urea. If this product in turn were hemi-formalized via the addition of 1 mole of formaldehyde in the form of a 25% aqueous solution, the final composition will contain 6.667 moles of water per mole of urea. If the composition be hemi-formalized by the addition of 1.5 moles of formaldehyde of 25% concentration of the water content would become 9.17 moles of water per mole of urea. Such a large water concentration depresses the degree of formalization.

We have found that the water concentrations of hemi-formalization products that are of the greatest practical utility range from about 0.5 to 5.0 moles of water per mole of urea. In applications where the minimum quantity of water is desired, the preferred range is between 0.5 and 1 mole of water per mole of urea. Where a product of good pourable viscosity is desired, and this includes most practical applications, it is found that between 3 and 4 moles of water per mole of urea constitutes the optimum range.

It is interesting to note that when the above described method of defining the hemi-formalization products is used, all formaldehyde that is present over and above about 2 moles of formaldehyde per mole of urea may be looked upon as formaldehyde of formalization.

The compositions of the hemi-formalization products, as well as those of the concentrated urea-formaldehyde resinous condensates that go into their preparation, instead of being defined in terms of their progenitors, may also be conveniently defined in terms of their nitrogen and carbon contents, provided, of course, that cognizance is taken of the fact that the nitrogen content has its origin in the urea, all of which latter is assumed to be tied up in the form of a urea-formaldehyde resinous condensate. In this system of calculation it is to be noted that there is one atom of carbon for every two atoms of nitrogen contained in the urea and all carbon over and above the carbon thus ear-marked for the urea constitutes carbon that has its origin in the formaldehyde. The nitrogen and carbon contents can readily be computed from the weight or molar proportions of the progenitors.

Our reason for dwelling at length upon the composition of and the defining of the "hemi-formalization" products at this point resides in the fact that these hemi-formalization products of urea-formaldehyde resinous condensates are essential intermediaries for the production of the hyper-formalization products of the present invention. We may define the hyper-formalization products of the present invention by first defining the hemi-formalization products and then defining the subsequent processing steps that are involved in the operation of hyper-formalization.

The products of the present invention may be defined in terms of their progenitors, i. e., the urea, formaldehyde, water, hyper-formalization catalyst, etc. Accordingly the products of the present invention may be defined as formalization products of urea-formaldehyde resinous condensates prepared by admixing a concentrated urea-formaldehyde resinous condensate with a formaldehyde preparation in the proportion of not less than 0.50 mole of formaldehyde per mole of urea contained in said urea-formaldehyde resinous condensate, which latter is prepared by reacting one mole of urea with between about 1.75 and about 2.5 moles of formaldehyde to the resinified state and then concentrating the resinified product to a net weight of between about 2.0 and 2.5 times the weight of urea consumed, aforesaid formaldehyde preparation having a formaldehyde content of not less than 25%, and, after admixture, adding a quantity of an acid possessed of a dissociation constant of greater than $1 \times 10^{-4}$, such that the pH will be depressed to below about 4.0, said acidity being maintained until not less than 0.10 mole of formaldehyde is consumed.

In a preferred embodiment of the present invention we recommend the use of acids possessed of dissociation constants of not less than about $1 \times 10^{-2}$ in quantities such as to depress the pH to below about 2.0

It is understood that the term "resinous condensate" as used throughout these specifications and the appended claims pertains to the condensate prior to its "cure" or conversion to the insoluble, infusible "C" stage.

It is thought clear from the foregoing disclosures that the formalization products of the present invention constitute a unique and novel group of materials having an exceedingly wide range of useful industrial application. Compositions containing the product of the present invention are useful in the manufacture or preparation of such varied products as the following, for convenience listed alphabetically:

Adhesives; casting compositions; cements; chemical intermediaries; cross-linking agents; dyeing aids; enamels; extenders for resins, plastics and rubbers; fillers for resins, rubbers, etc.; floor coverings; frictional elements; glues; impregnating agents; inks; insulating compositions; insecticides; leather substitutes; lacquers; molding compositions; paints; plastics; plywood; proofing agents; stiffening agents; textile sizing agents; varnishes, etc.

In the foregoing paragraphs we have described our invention in a broad manner and have presented generalized as well as specific and detailed directions for the production of the products of the invention. We have also presented data relative to the matter of equivalents as well as the various modifications that are possible. This has been followed by a description of the unique and distinctive properties of the hyper-formalized urea-formaldehyde resinous condensates, and an array of examples depicting their utility.

The invention has been described in connection with a number of illustrative embodiments, materials, proportions, conditions and arrangements of operations for the carrying out of the same. The invention is not to be regarded as restricted to the foregoing specifically detailed disclosures, but should be regarded as encompassing the broad and general disclosures. Nor should any limitations be imported which are not required by the language of the appended claims and the state of the prior art. The invention should not be considered as dependent upon any explanation or theory which has been set forth as descriptive of the action involved, nor upon the accuracy or soundness of any theoretical statements so advanced. It is obvious that many modifications and variations in the manipulative technique and in the components may be made without departing from the spirit and scope of the invention as encompassed by the conditions and concentration ranges disclosed in these specifications and as defined in the appended claims.

We claim:

1. The method of producing soluble and fusible hyper-formalization products of urea-formaldehyde resinous condensates, which comprises the steps of reacting a mole of urea with between about 1.75 and 2.5 moles of formaldehyde in the presence of water to the soluble and fusible resinified stage, said resinification being carried out in an acid environment to assure the practically complete resinification of the urea, then substantially neutralizing the excess acidity and concentrating the resinified product to a net weight of between about 2.0 and 2.5 times the weight of urea consumed and then adding between about 0.50 and 1.5 moles of formaldehyde per mole of the aforesaid urea, in a form assaying not less than 25% of formaldehyde, adding an acid having a dissociation constant greater than $1 \times 10^{-4}$ in a quantity sufficient to depress the pH of the mixture to below 4.0 but insufficient to bring about excessive decomposition, and maintaining said acidity until not less than 0.1 mole of formaldehyde is consumed.

2. The method of producing soluble and fusible hyper-formalization products of urea-formaldehyde resinous condensates, which comprises the steps of reacting a mole of urea with between about 1.75 and 2.5 moles of formaldehyde in the presence of water to the soluble and fusible resinified stage, said resinification being carried out in an acid environment to assure the practically complete resinification of the urea, then substantially neutralizing the excess acidity and concentrating the resinified product to a net weight of between about 2.0 and 2.5 times the weight of urea consumed and then adding between about 0.50 and 1.5 moles of formaldehyde per mole of the aforesaid urea, in a form assaying not less than 25% of formaldehyde, adding an acid having a dissociation constant greater than $1 \times 10^{-2}$ in a quantity sufficient to depress the pH of the mixture to below 2.0 but insufficient to bring about excessive decomposition, and maintaining said acidity until not less than 0.1 mole of formaldehyde is consumed.

3. Soluble and fusible hyper-formalization products of urea-formaldehyde resinous condensates made in accordance with the method defined in claim 1.

4. The method of producing soluble and fusible hyper-formalization products of urea-formaldehyde resinous condensates, which comprises the steps of reacting a mole of urea with between about 1.75 and 2.5 moles of formaldehyde in the presence of water to the soluble and fusible resinified stage, said resinification being carried out in an acid environment to assure the practically complete resinification of the urea, then substantially neutralizing the excess acidity and concentrating the resinified product to a net weight of between about 2.0 and 2.5 times the weight of urea consumed and then adding between about 0.50 and 1.5 moles of paraformaldehyde per mole of the aforesaid urea, adding an acid having a dissociation constant greater than $1 \times 10^{-4}$ in a quantity sufficient to depress the pH of the mixture to below 4.0 but insufficient to bring about excessive decomposition, and maintaining said acidity until not less than 0.1 mole of formaldehyde is consumed.

5. The method of producing soluble and fusible hyper-formalization products of urea-formaldehyde resinous condensates, which comprises the steps of reacting a mole of urea with between about 1.75 and 2.5 moles of formaldehyde in the presence of water to the soluble and fusible resinified stage, said resinification being carried out in an acid environment to assure the practically complete resinification of the urea, then substantially neutralizing the excess acidity and concentrating the resinified product to a net weight of between about 2.0 and 2.5 times the weight of urea consumed and then adding between about 0.50 and 1.5 moles of paraformaldehyde per mole of the aforesaid urea, adding an acid having a dissociation constant greater than $1 \times 10^{-2}$ in a quantity sufficient to depress the pH of the mixture to below 2.0 but insufficient to bring about excessive decomposition, and maintaining said acidity until not less than 0.1 mole of formaldehyde is consumed.

6. Soluble and fusible hyper-formalization products of urea-formaldehyde resinous condensates made in accordance with the method defined in claim 4.

EMIL E. NOVOTNY.
GEORGE KARL VOGELSANG.
ERNEST E. NOVOTNY.

REFERENCES CITED

The following references are of record in the file of this patent:

UNITED STATES PATENTS

| Number | Name | Date |
|---|---|---|
| 2,033,718 | Kraus | Mar. 10, 1936 |
| 2,093,364 | Pollak | Sept. 14, 1937 |

FOREIGN PATENTS

| Number | Country | Date |
|---|---|---|
| 792,562 | France | July 5, 1935 |

OTHER REFERENCES

Formaldehyde, by J. F. Walker, 1944 (Reinhold Pub. Co.), pages 138 and 139.